(12) United States Patent
Eknoian

(10) Patent No.: US 6,683,129 B1
(45) Date of Patent: Jan. 27, 2004

(54) SALT SENSITIVE AQUEOUS EMULSIONS

(75) Inventor: Michael W. Eknoian, Warren, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 09/540,033

(22) Filed: Mar. 31, 2000

(51) Int. Cl.⁷ .............................................. C08L 41/00
(52) U.S. Cl. .................. 524/547; 524/548; 524/549; 524/555; 524/556; 524/558; 524/559; 524/808; 524/812; 524/814; 524/815; 524/816; 524/817; 524/833; 524/819; 524/820; 524/823; 524/824; 524/832
(58) Field of Search ................ 524/547, 548, 524/555, 556, 558, 559, 808, 812, 814, 815, 816, 817, 819, 820, 823, 824, 832, 833, 549

(56) References Cited

U.S. PATENT DOCUMENTS

| 3,266,971 | A | * | 8/1966 | Miller, Jr. .................... 151/251 |
| 3,284,394 | A | * | 11/1966 | Suen et al. ................. 524/100 |
| 3,301,806 | A | * | 1/1967 | Guziak et al. .............. 524/824 |
| 3,321,431 | A | * | 5/1967 | Cruden et al. .............. 524/725 |
| 3,365,410 | A | * | 1/1968 | Wesslau et al. ............. 524/521 |
| 3,366,588 | A | * | 1/1968 | Booth ........................ 524/114 |
| 3,457,209 | A | * | 7/1969 | Mikofalvy .................. 524/831 |
| 3,505,045 | A | * | 4/1970 | Klein ............................ 51/295 |
| 3,547,847 | A | * | 12/1970 | Levine et al. ............... 524/833 |
| 3,649,581 | A | * | 3/1972 | Mast et al. ................. 260/29.6 |
| 3,677,989 | A | * | 7/1972 | Jenkinson .............. 260/29.6 H |
| 3,714,078 | A | * | 1/1973 | Gordon et al. ................ 521/65 |
| 3,736,286 | A | * | 5/1973 | Scott et al. .................. 524/516 |
| 3,784,498 | A | * | 1/1974 | Ceska ......................... 524/819 |
| 3,806,484 | A | * | 4/1974 | Dargan ....................... 524/723 |
| 4,151,143 | A | * | 4/1979 | Blank et al. ......... 260/29.6 RW |
| 4,173,669 | A | * | 11/1979 | Ashida et al. ................. 428/35 |
| 4,391,878 | A | | 7/1983 | Drach |
| 4,522,972 | A | * | 6/1985 | Mondt et al. ................ 524/548 |
| 4,801,671 | A | * | 1/1989 | Shay et al. .................. 526/214 |
| 4,960,463 | A | | 10/1990 | Brown |
| 5,082,896 | A | * | 1/1992 | Chan .......................... 524/823 |
| 5,312,883 | A | | 5/1994 | Komatsu et al. |
| 5,356,968 | A | * | 10/1994 | Rupaner et al. ............. 524/157 |
| 5,527,853 | A | | 6/1996 | Landy et al. |
| 5,631,317 | A | | 5/1997 | Komatsu et al. |
| 5,656,367 | A | | 8/1997 | Iovine et al. |
| 5,693,707 | A | | 12/1997 | Cheng et al. |
| 5,986,004 | A | | 11/1999 | Pomplun et al. |
| 6,001,916 | A | | 12/1999 | Walker et al. |
| 6,013,721 | A | | 1/2000 | Schall et al. |
| 6,040,409 | A | | 3/2000 | Lau et al. |

FOREIGN PATENT DOCUMENTS

WO    WO 00/38751    7/2000

* cited by examiner

*Primary Examiner*—Judy M. Reddick
(74) *Attorney, Agent, or Firm*—Thomas F. Roland; Charles W. Almer

(57) ABSTRACT

This invention relates to aqueous emulsions comprising a water-dispersible copolymer which is non-dispersible in aqueous solutions containing 0.5% or more of an inorganic salt, comprising acidic ethylenically unsaturated monomers and ethylenically unsaturated monomers. The acidic ethylenically unsaturated monomers and the ethylenically unsaturated monomers are defined herein. The present invention also pertains to emulsion polymerization methods for making the aqueous emulsions with or without a surfactant.

26 Claims, No Drawings

SALT SENSITIVE AQUEOUS EMULSIONS

FIELD OF THE INVENTION

This invention relates to aqueous emulsions comprising a water-dispersible copolymer which is non-dispersible in aqueous solutions containing 0.5% or more of an inorganic salt, comprising acidic ethylenically unsaturated monomers and ethylenically unsaturated monomers. The acidic ethylenically unsaturated monomers and the ethylenically unsaturated monomers are defined herein. The present invention also pertains to emulsion polymerization methods for making the aqueous emulsions with or without a surfactant.

BACKGROUND OF THE INVENTION

Water-soluble polymers, soluble in tap water but insoluble in dilute salt solutions, are known in the art, however many of these water-soluble polymer compositions are not entirely satisfactory. Moreover, many water-soluble copolymers require alkali to remove the polymeric film which is often difficult and unsafe for the consumer. The present invention provides improved water-dispersible copolymer compositions without the disadvantages characteristic of previously known compositions.

SUMMARY OF THE INVENTION

In a first embodiment, the present invention is directed to an aqueous emulsion comprising a water-dispersible copolymer which is non-dispersible in aqueous solutions containing 0.5% or more of an inorganic salt, wherein the water-dispersible copolymer comprises in percentages by weight:

(A) from about 10% to about 90% of an acidic ethylenically unsaturated monomer; and (B) from about 10% to about 90% of an ethylenically unsaturated monomer selected from the group of monomer formulas consisting of:
  (i) $CH_2=C(R_1)COR_2$;
  (ii) $R_3OOC-CH=CH-COOR_4$;
  (iii) $CH_2=C(R_5)OCOR_6$;
  (iv) $CH_2=C(COOR_7)CH_2COOR_8$;
  (v) $CH_3CH=CHCOOR_9$;
  (vi) $R_{10}C_6H_4CR_{11}=CHR_{11}$; and
  (vii) $R_{12}CH=CHR_{13}$;
  wherein $R_1$ is hydrogen or methyl and $R_2$ is —OZ' or —N(Z")(Z"), wherein Z' is an alkyl group having from 1 to 7 carbon atoms, and Z" is independently selected from the group consisting of hydrogen and alkyl groups having from 1 to 6 carbon atoms; $R_3$ and $R_4$ are independently hydrogen or an alkyl group having from 1 to 7 carbon atoms, with the proviso that $R_3$ and $R_4$ are not both hydrogen; $R_5$ is hydrogen or methyl and $R_6$ is an alkyl group having from 1 to 7 carbon atoms; $R_7$ and $R_8$ are independently hydrogen or an alkyl group having from 1 to 7 carbon atoms, with the proviso that $R_7$ and $R_8$ are not both hydrogen; $R_9$ is an alkyl group having from 1 to 7 carbon atoms; $R_{10}$ and $R_{11}$ are hydrogen; $R_{12}$ and $R_{13}$ are independently selected from the group consisting of hydrogen, —CN, —NHCHO, —NHCOCH$_3$, and an alkyl group having from 1 to 7 carbon atoms; and the copolymer has a weight average molecular weight greater than about 25,000 and is present in an amount from about 20% to about 70%.

In a second embodiment, the present invention is directed to an aqueous emulsion comprising a water-dispersible copolymer which is non-dispersible in aqueous solutions containing 0.5% or more of an inorganic salt, wherein the water-dispersible copolymer comprises in percentages by weight:

(A) from about 10% to about 90% of an acidic ethylenically unsaturated monomer; and (B) from about 10% to about 90% of an ethylenically unsaturated monomer selected from the group of monomer formulas consisting of:
  (i) $CH_2=C(R'_1)COR'_2$;
  (ii) $R'_3OOC-CH=CH-COOR'_4$;
  (iii) $CH_2=C(R'_5)OCOR'_6$;
  (iv) $CH_2=C(COOR'_7)CH_2COOR'_8$;
  (v) $CH_3CH=CHCOOR'_9$;
  (vi) $R'_{10}C_6H_4CR'_{11}=CHR'_{11}$; and
  (vii) $R'_{12}CH=CHR'_{13}$;
  wherein $R'_1$ is hydrogen or methyl, and $R'_2$ is selected from the group consisting of —OZ', —N(Z")(Z"), and —OZ'"OH, wherein Z' is an alkyl group having from 8 to 18 carbon atoms; Z" is independently selected from the group consisting of alkyl groups having from 7 to 10 carbon atoms, dimethylamino alkyl groups having from 1 to 5 carbon atoms, and hydroxyalkyl groups having from 1 to 5 carbon atoms; and Z'" is an alkyl group having from 1 to 4 carbon atoms; $R'_3$ and $R'_4$ are independently an alkyl group having from 8 to 18 carbon atoms; $R'_5$ is hydrogen or methyl and $R'_6$ is an alkyl group having from 8 to 18 carbon atoms; $R'_7$ and $R'_8$ are independently an alkyl group having from 8 to 18 carbon atoms; $R'_9$ is an alkyl group having from 8 to 18 carbon atoms; $R'_{10}$ and $R'_{11}$ are independently an alkyl group having from 1 to 2 carbon atoms; $R'_{12}$ and $R'_{13}$ are independently selected from the group consisting of 2-pyrrolidinone, N-caprolactam, 2-pyridine, 3-pyridine, 4-pyridine, and an alkyl group having from 7 to 18 carbon atoms, with the proviso that $R_{12}$ and $R_{13}$ are not at the same time 2-pyrrolidinone, N-caprolactam, 2-pyridine, 3-pyridine, or 4-pyridine; and the copolymer has a weight average molecular weight greater than about 25,000 and is present in an amount from about 20% to about 70%.

In a third embodiment, the present invention is directed to an aqueous emulsion comprising a water-dispersible copolymer which is non-dispersible in aqueous solutions containing 0.5% or more of an inorganic salt, wherein the water-dispersible copolymer comprises in percentages by weight:

(A) from about 10% to about 80% of an acidic ethylenically unsaturated monomer, with the proviso that the acidic ethylenically unsaturated monomer is not acrylic acid;

(B) from about 10% to about 80% of an ethylenically unsaturated monomer selected from the group of monomer formulas consisting of:
  (i) $CH_2=C(R_1)COR_2$;
  (ii) $R_3OOC-CH=CH-COOR_4$;
  (iii) $CH_2=C(R_5)OCOR_6$;
  (iv) $CH_2=C(COOR_7)CH_2COOR_8$;
  (v) $CH_3CH=CHCOOR_9$;
  (vi) $R_{10}C_6H_4CR_{11}=CHR_{11}$; and
  (vii) $R_{12}CH=CHR_{13}$;
  wherein $R_1$ is hydrogen or methyl and $R_2$ is —OZ' or —N(Z")(Z"), wherein Z' is an alkyl group having from 1 to 7 carbon atoms, and Z" is independently selected from the group consisting of hydrogen and alkyl groups having from 1 to 6 carbon atoms; $R_3$ and $R_4$ are independently hydrogen or an alkyl group having from 1 to 7 carbon atoms, with the proviso that $R_3$ and $R_4$ are not both hydrogen; $R_5$ is hydrogen or methyl and $R_6$ is an alkyl group having from 1 to 7 carbon atoms; $R_7$ and $R_8$ are independently hydrogen or an alkyl group having from 1 to 7 carbon atoms, with the proviso that $R_7$ and $R_8$ are not both hydrogen; $R_9$ is an alkyl group having from 1 to 7 carbon atoms; $R_{10}$ and $R_{11}$ are hydrogen; and $R_{12}$ and $R_{13}$ are independently selected from the group consisting of hydrogen, —CN, —NHCHO, and an alkyl group having from 1 to 7 carbon atoms; and (C) from about 10% to about 80% of an ethylenically unsaturated monomer selected from the group of monomer formulas consisting of:
(i) $CH_2=C(R'_1)COR'_2$;
(ii) $R'_3OOC-CH=CH-COOR'_4$;
(iii) $CH_2=C(R'_5)OCOR'_6$;
(iv) $CH_2=C(COOR'_7)CH_2COOR'_8$;
(v) $CH_3CH=CHCOOR'_9$;
(vi) $R'_{10}C_6H_4CR'_{11}=CHR'_{11}$; and
(vii) $R'_{12}CH=CHR'_{13}$;

wherein $R'_1$ is hydrogen or methyl, and $R'_2$ is selected from the group consisting of —OZ', —N(Z")(Z"), and —OZ'"OH, wherein Z' is an alkyl group having from 8 to 18 carbon atoms; Z" is independently selected from the group consisting of alkyl groups having from 7 to 10 carbon atoms, dimethylamino alkyl groups having from 1 to 5 carbon atoms, and hydroxyalkyl groups having from 1 to 5 carbon atoms; and Z'" is an alkyl group having from 1 to 4 carbon atoms; $R'_3$ and $R'_4$ are independently an alkyl group having from 8 to 18 carbon atoms; $R'_5$ is hydrogen or methyl and $R'_6$ is an alkyl group having from 8 to 18 carbon atoms; $R'_7$ and $R'_8$ are independently an alkyl group having from 8 to 18 carbon atoms; $R'_9$ is an alkyl group having from 8 to 18 carbon atoms; $R'_{10}$ and $R'_{11}$ are independently an alkyl group having from 1 to 2 carbon atoms; $R'_{12}$ and $R'_{13}$ are independently selected from the group consisting of 2-pyrrolidinone, N-caprolactam, and an alkyl group having from 7 to 18 carbon atoms, with the proviso that $R_{12}$ and $R_{13}$ are not both 2-pyrrolidinone, are not both N-caprolactam, or are not a mixture thereof; and the copolymer has a weight average molecular weight greater than about 25,000 and is present in an amount from about 20% to about 70%.

The present invention is also directed to methods for preparing the aqueous emulsions in the above embodiments. A first method comprises the steps of (a) providing the monomers in one of the above embodiments; and (b) emulsion polymerizing the monomers in water at a solids level from about 20% to about 70% in the presence of a surfactant. A second method comprises the steps of (a) providing the monomers in one of the above embodiments; (b) neutralizing the monomers in water to a level from about 2% to about 15% molar of the acidic ethylenically unsaturated monomer from (A); and (c) emulsion polymerizing the monomers at a solids level from about 20% to about 60% without a surfactant.

DETAILED DESCRIPTION OF THE INVENTION

In accord with the present invention, aqueous emulsions comprising water-dispersible copolymers are provided that are non-dispersible in dilute inorganic salt solutions. The salt-sensitive copolymers are soluble/dispersible in tap water but are non-dispersible in water containing at least 0.5% of an inorganic monovalent, divalent, or trivalent salt. The water-dispersible copolymers are prepared from acidic ethylenically unsaturated monomers and a variety of other ethylenically unsaturated monomers. By carefully selecting the type and amount of the acidic ethylenically unsaturated monomer, one can obtain copolymer products having good hydrophilic properties such that the copolymer is water-dispersible, especially when partially neutralized, but is non-dispersible in dilute inorganic salt solutions. By carefully selecting the type and amount of the other ethylenically unsaturated monomers, one can obtain copolymer products useful for non-woven fabrics or papers having good wet strength and permeability to body fluids. The water-dispersible copolymers may be employed in protective top coats, floor polishes, temporary printing, adhesives, skin creams, sun screens, hair fixatives, temporary decorative paints, marine coatings, repulpable paper coatings, glass fiber sizing, time release/erodible coatings or particles, and antiperspirant-film not removed by perspiration but removed by soap and water.

Unlike conventional water-soluble polymers, the aqueous emulsions of the present invention do not require divalent ion inhibitors. Film formation of latexes differs from film formation of solution polymers since particle coalescence is needed to form a film of high cohesive strength in emulsion polymers. For solution polymers, particle coalescence is not necessary because the solvent acts as a plasticizer which aids in the film formation by allowing polymer chains to mix and entangle. For emulsion polymers, the cohesive strength of the polymer film is reduced if the particles do not fully coalesce because of the reduction of chain entanglements. For emulsion polymers, the surface active layer remains as an interfacial boundary between particles and prevents full chain entanglement to the extent observed from solution polymers. As a result, films derived from the aqueous emulsions of the present invention will readily disperse in the presence of water. In addition, the novel polymer film will also disperse in hard water since divalent ions do not inhibit the redispersability by the film derived from emulsions. In contrast, for polymer films derived solution, hard water is less effective in solubilizing the polymer since divalent ions inhibit the movement of the highly entangled polymer chains. For films derived from solution polymers, ion regulating agents are required to enhance the solubilzation in hard water. This is the main reason why the aqueous emulsions of the present invention do not require a divalent ion inhibitor (sequestering agent) to aid in the redispersability in tap water, especially hard water. Preferably the particle size of the water-dispersible copolymer is from about 0.05 micron to about 0.8 micron.

The present invention also provides emulsion polymerization methods to form stable, low viscosity, emulsions of the water-dispersible copolymers both with the use of surfactants and without the use of surfactants (in situ stabilization). In the surfactant embodiment, a seeded or unseeded process is utilized to copolymerize an acidic ethylenically unsaturated monomer, such as an unsaturated carboxylic acid monomer, and other ethylenically unsaturated monomers, such as alkyl (meth)acrylate(s) or vinyl monomer(s), in water with a surfactant. In the non-surfactant embodiment, the monomers are first neutralized in water to a level from about 2% to about 15% molar of the acidic ethylenically unsaturated monomer, and the resulting emulsion is then polymerized without a surfactant. In a preferred (non-surfactant) method, a seed polymer is polymerized in water with the first stage comprising the acidic ethylenically unsaturated monomer, and other ethylenically unsaturated monomers, which are at least partially neutralized (10% to 100%) with aqueous ammonia to form the in situ stabilizer colloid. In the second stage, this colloid is copolymerized with 100 parts of an ethylenically unsaturated monomer, such as acrylic monomers like 2-ethyl hexyl acrylate, styrene, butyl acrylate, ethyl acrylate, acrylic acid, methacrylic acid, etc. and/or vinyl acetate, monoethyl maleate, maleic acid, itaconic acid, etc. When the emulsions are dried, the resulting film particles are dispersible in water since the copolymer contains a high concentration of hydrophilic monomers, such as acidic functionality. This acidic functionality also prevents the particles from dispersing in aqueous salt solutions. To further improve water dispersability, a chain transfer agent, or polymerization terminator, such as dodecyl mercaptan, may be added to reduce the molecular weight of the polymer during the polymerization process. Typical emulsion polymerizations are batch, semi-batch, slow-addition, and continuous processes. Monomers can be slow added linearly, or via gradient simultaneously, or separately.

As set out above, the salt-sensitive copolymers are soluble/dispersible in tap water but are non-dispersible in water containing at least 0.5% of an inorganic monovalent, divalent, or trivalent metal salt. Examples of monovalent inorganic metal salts include sodium chloride, potassium phosphate, and sodium acetate. Examples of divalent inorganic metal salts include magnesium chloride, barium chloride, calcium chloride, calcium carbonate, and magnesium acetate. Examples of trivalent inorganic metal salts include aluminum chloride, boron chloride, and aluminum acetate.

The term "alkyl group", as used herein, refers to branched or unbranched hydrocarbon groups as well as cyclic and bicyclic hydrocarbon groups. The term halogen, as used herein, refers to the chemically related elements consisting of fluorine, chlorine, bromine and iodine.

In a first embodiment, the present invention is directed to an aqueous emulsion comprising a water-dispersible copolymer which is non-dispersible in aqueous solutions containing 0.5% or more of an inorganic salt, wherein the water-dispersible copolymer comprises in percentages by weight:

(A) from about 10% to about 90% of an acidic ethylenically unsaturated monomer; and (B) from about 10% to about 90% of an ethylenically unsaturated monomer selected from the group of monomer formulas consisting of:
 (i) $CH_2=C(R_1)COR_2$;
 (ii) $R_3OOC-CH=CH-COOR_4$;
 (iii) $CH_2=C(R_5)OCOR_6$;
 (iv) $CH_2=C(COOR_7)CH_2COOR_8$;
 (v) $CH_3CH=CHCOOR_9$;
 (vi) $R_{10}C_6H_4CR_{11}=CHR_{11}$; and
 (vii) $R_{12}CH=CHR_{13}$;
 wherein $R_1$ is hydrogen or methyl and $R_2$ is $-OZ'$ or $-N(Z'')(Z'')$, wherein $Z'$ is an alkyl group having from 1 to 7 carbon atoms, and $Z''$ is independently selected from the group consisting of hydrogen and alkyl groups having from 1 to 6 carbon atoms; $R_3$ and $R_4$ are independently hydrogen or an alkyl group having from 1 to 7 carbon atoms, with the proviso that $R_3$ and $R_4$ are not both hydrogen; $R_5$ is hydrogen or methyl and $R_6$ is an alkyl group having from 1 to 7 carbon atoms; $R_7$ and $R_8$ are independently hydrogen or an alkyl group having from 1 to 7 carbon atoms, with the proviso that $R_7$ and $R_8$ are not both hydrogen; $R_9$ is an alkyl group having from 1 to 7 carbon atoms; $R_{10}$ and $R_{11}$ are hydrogen; $R_{12}$ and $R_{13}$ are independently selected from the group consisting of hydrogen, $-CN$, $-NHCHO$, $-NHCOCH_3$, and an alkyl group having from 1 to 7 carbon atoms; and the copolymer has a weight average molecular weight greater than about 25,000 and is present in an amount from about 20% to about 70%.

In this embodiment, the acidic ethylenically unsaturated monomers from (A) may be selected from the group consisting of monomers containing a carboxylic acid group, monomers containing a sulfonic acid group, and monomers containing a phosphoric acid group. Examples of monomers containing a carboxylic acid group may be selected from the group consisting of acrylic acid, methacrylic acid, maleic acid, maleic acid half esters, maleic anhydride, itaconic acid, and crotonic acid. Preferably, the monomer containing a carboxylic acid group is methacrylic acid. Examples of monomers containing a sulfonic acid group may be selected from the group consisting of styrene sulfonic acid, 2-acrylamido-2-methylpropane sulfonic acid, and sodium vinyl sulfonate. Preferably, the monomer containing a sulfonic acid group is styrene sulfonic acid or 2-acrylamido-2-methylpropane sulfonic acid. Examples of monomers containing a phosphoric acid group may be selected from the group consisting of styrene phosphoric acid, sodium vinyl phosphonate, and $CH_2=C(CH_3)COO(CH_2)_nOPO_3H$, wherein n is from 2 to 4. Preferably, the monomer containing a phosphoric acid group is $CH_2=C(CH_3)COO(CH_2)_nOPO_3H$, wherein n is from 2 to 4.

Preferably, the ethylenically unsaturated monomer from (B) is (i) $CH_2=C(R_1)COR_2$, wherein $R_1$ is methyl and $R_2$ is $-OZ'_1$ wherein $Z'$ is an alkyl group having from 1 to 4 carbon atoms. Examples of the ethylenically unsaturated monomer from (B) (i), $CH_2=C(R_1)COR_2$, may be selected from the group of (meth)acrylamides consisting of (meth)acrylamide, N-methyl (meth)acrylamide, N-ethyl (meth)acrylamide, N-propyl (meth)acrylamide, N-butyl (meth)acrylamide, N-pentyl (meth)acrylamide, N-hexyl (meth)acrylamide, N-heptyl (meth)acrylamide, N,N-dimethyl (meth)acrylamide, N,N-diethyl (meth)acrylamide, N,N-dipropyl (meth)acrylamide, and N,N-dibutyl (meth)acrylamide. Other examples of the ethylenically unsaturated monomer from (B) (i), $CH_2=C(R_1)COR_2$, may be selected from the group of (meth)acrylates consisting of methyl (meth)acrylate, ethyl (meth)acrylate, propyl (meth)acrylate, butyl (meth)acrylate, pentyl (meth)acrylate, hexyl (meth)acrylate, heptyl (meth)acrylate, dimethyl (meth)acrylate, diethyl (meth)acrylate, dipropyl (meth)acrylate, and dibutyl (meth)acrylate.

Preferably, the ethylenically unsaturated monomer from (B) is (ii) $R_3OOC-CH=CH-COOR_4$, wherein $R_3$ and $R_4$ are independently an alkyl group having from 1 to 4 carbon atoms, more preferably from 2 to 4 carbon atoms.

Preferably, the ethylenically unsaturated monomer from (B) is (iii) $CH_2=C(R_5)OCOR_6$, wherein $R_5$ is methyl and $R_6$ is an alkyl group having from 1 to 4 carbon atoms. Examples of the ethylenically unsaturated monomer from (B) (iii), $CH_2=C(R_5)OCOR_6$, may be selected from the group consisting of vinyl formate, vinyl acetate, vinyl propionate, vinyl isobutyrate, and vinyl pivalate.

Preferably, the ethylenically unsaturated monomer from (B) is (iv) $CH_2=C(COOR_7)CH_2COOR_8$, wherein $R_7$ and $R_8$ are independently an alkyl group having from 1 to 4 carbon atoms, more preferably from 2 to 4 carbon atoms. Preferably, the ethylenically unsaturated monomer from (B) is (v) $CH_3CH=CHCOOR_9$, wherein $R_9$ is an alkyl group having from 1 to 4 carbon atoms, more preferably from 2 to 4 carbon atoms. Preferably, the ethylenically unsaturated monomer from (B) is (vi) styrene.

Preferably, the ethylenically unsaturated monomer from (B) is (vii) $R_{12}CH=CHR_{13}$, wherein $R_{12}$ and $R_{13}$ are independently hydrogen or methyl. Examples of the ethylenically unsaturated monomer from (B) (vii), $R_{12}CH=CHR_{13}$, may be selected from the group consisting of ethylene, propylene, butylene, butadiene, acrylonitrile, N-vinyl formamide, and vinyl acetamide.

In this embodiment, the exact amount of acidic ethylenically unsaturated monomer from (A) and ethylenically unsaturated monomer from (B) present in the water-dispersible copolymer is a matter of preference subject to such factors as the particular type of ethylenically unsaturated monomer employed, the molecular weight of the water-dispersible copolymer employed, and are particular to the end use application. In a preferred embodiment, the acidic ethylenically unsaturated monomer from (A) is present in the water-dispersible copolymer in an amount from about 10% to about 90%, preferably from about 25% to about 75%, more preferably from about 30% to about 70%, and most preferably from about 35% to about 65%, by weight. In a preferred embodiment, the ethylenically unsaturated monomer from (B) is present in the water-dispersible copolymer in an amount from about 10% to about 90%, preferably from about 25% to about 75%, more preferably from about 30% to about 70%, and most preferably from about 35% to about 65%, by weight.

In a second embodiment, the present invention is directed to an aqueous emulsion comprising a water-dispersible copolymer which is non-dispersible in aqueous solutions containing 0.5% or more of an inorganic salt, wherein the water-dispersible copolymer comprises in percentages by weight:

(A) from about 10% to about 90% of an acidic ethylenically unsaturated monomer; and (B) from about 10% to about 90% of an ethylenically unsaturated monomer selected from the group of monomer formulas consisting of:
  (i) $CH_2=C(R'_1)COR'_2$;
  (ii) $R'_3OOC-CH=CH-COOR'_4$;
  (iii) $CH_2=C(R'_5)OCOR'_6$;
  (iv) $CH_2=C(COOR'_7)CH_2COOR'_8$;
  (v) $CH_3CH=CHCOOR'_9$;
  (vi) $R'_{10}C_6H_4CR'_{11}=CHR'_{11}$; and
  (vii) $R'_{12}CH=CHR'_{13}$;

wherein $R'_1$ is hydrogen or methyl, and $R'_2$ is selected from the group consisting of $-OZ'$, $-N(Z'')(Z'')$, and $-OZ'''OH$, wherein $Z'$ is an alkyl group having from 8 to 18 carbon atoms; $Z''$ is independently selected from the group consisting of alkyl groups having from 7 to 10 carbon atoms, dimethylamino alkyl groups having from 1 to 5 carbon atoms, and hydroxyalkyl groups having from 1 to 5 carbon atoms; and $Z'''$ is an alkyl group having from 1 to 4 carbon atoms; $R'_3$ and $R'_4$ are independently an alkyl group having from 8 to 18 carbon atoms; $R'_5$ is hydrogen or methyl and $R'_6$ is an alkyl group having from 8 to 18 carbon atoms; $R'_7$ and $R'_8$ are independently an alkyl group having from 8 to 18 carbon atoms; $R'_9$ is an alkyl group having from 8 to 18 carbon atoms; $R'_{10}$ and $R'_{11}$ are independently an alkyl group having from 1 to 2 carbon atoms; $R'_{12}$ and $R'_{13}$ are independently selected from the group consisting of 2-pyrrolidinone, N-caprolactam, 2-pyridine, 3-pyridine, 4-pyridine, and an alkyl group having from 7 to 18 carbon atoms, with the proviso that $R_{12}$ and $R_{13}$ are not at the same time 2-pyrrolidinone, N-caprolactam, 2-pyridine, 3-pyridine, or 4-pyridine; and the copolymer has a weight average molecular weight greater than about 25,000 and is present in an amount from about 20% to about 70%.

The acidic ethylenically unsaturated monomers from (A) in this embodiment are as defined above.

Preferably, the ethylenically unsaturated monomer from (B) is (i) $CH_2=C(R'_1)COR'_2$, wherein $R'_1$ is methyl, $R'_2$ is selected from the group consisting of $-OZ'$, $-N(Z'')(Z'')$, and $-OZ'''OH$, wherein $Z'$ is an alkyl group having from 8 to 12 carbon atoms, preferably from 9 to 11 carbon atoms; $Z''$ is independently selected from the group consisting of alkyl groups having from 8 to 10 carbon atoms, dimethylamino alkyl groups having from 1 to 3 carbon atoms, and hydroxyalkyl groups having from 1 to 3 carbon atoms; and $Z'''$ is an alkyl group having from 1 to 2 carbon atoms. Examples of the ethylenically unsaturated monomer from (B) (i), $CH_2=C(R'_1)COR'_2$, may be selected from the group of (meth)acrylamides consisting of N-t-octyl (meth)acrylamide, N,N-di-t-octyl (meth)acrylamide, 2-(dimethylamino)ethyl (methacrylate), N-[3-(dimethylamino)propyl] (meth)acrylamide, N-(hydroxymethyl) (meth)acrylamide, and N-(isobutoxymethyl)acrylamide. Other examples of the ethylenically unsaturated monomer from (B) (i), $CH_2=C(R'_1)COR'_2$, may be selected from the group of (meth)acrylates consisting of 2-ethyl hexyl (meth)acrylate, octyl (meth)acrylate, t-octyl (meth)acrylate, nonyl (meth)acrylate, decyl (meth)acrylate, isobornyl (meth)acrylate, lauryl (meth)acrylate, and steryl (meth)acrylate. Other examples of the ethylenically unsaturated monomer from (B) (i), $CH_2=C(R'_1)COR'_2$, may be selected from the group of hydroxy (meth)acrylates consisting of 1-hydroxymethyl (meth)acrylate, 2-hydroxymethyl (meth)acrylate, 1-hydroxyethyl (meth)acrylate, 2-hydroxyethyl (meth)acrylate, 1-hydroxypropyl (meth)acrylate, 2-hydroxypropyl (meth)acrylate, and 3-hydroxypropyl (meth)acrylate.

Preferably, the ethylenically unsaturated monomer from (B) is (ii) $R'_3OOC-CH=CH-COOR'_4$, wherein $R'_3$ and $R'_4$ are independently an alkyl group having from 8 to 12 carbon atoms, preferably from 9 to 11 carbon atoms.

Preferably, the ethylenically unsaturated monomer from (B) is (iii) $CH_2=C(R'_5)OCOR'_6$, wherein $R'_5$ is methyl, and $R'_6$ is an alkyl group having from 8 to 12 carbon atoms, preferably from 9 to 11 carbon atoms. Examples of the ethylenically unsaturated monomer from (B) iii), $CH_2=C(R'_5)OCOR'_6$, and is selected from the group consisting of vinyl 2-ethylhexonate, vinyl p-t-butyl benzoate, vinyl esters of versatic acid, vinyl laurate, and vinyl stearate.

Preferably, the ethylenically unsaturated monomer from (B) is (iv) $CH_2=C(COOR'_7)CH_2COOR'_8$, wherein $R'_7$ and $R'_8$ are independently an alkyl group having from 8 to 12 carbon atoms, preferably from 9 to 11 carbon atoms. Preferably, the ethylenically unsaturated monomer from (B) is (v) $CH_3CH=CHCOOR'_9$, and $R'_9$ is an alkyl group having from 8 to 12 carbon atoms, preferably from 9 to 11 carbon atoms. Preferably, the ethylenically unsaturated monomer from (B) is (vi) $R'_{10}C_6H_4CR'_{11}=CHR'_{11}$, and $R'_{10}$ and $R'_{11}$ are independently methyl.

Preferably, the ethylenically unsaturated monomer from (B) is (vii) $R'_{12}CH=CHR'_{13}$, wherein $R'_{12}$ and $R'_{13}$ are independently selected from the group consisting of 2-pyrrolidinone, N-caprolactam, 2-pyridine, 3-pyridine, 4-pyridine, and an alkyl group having from 7 to 12 carbon atoms, preferably from 8 to 11 carbon atoms. Examples of the ethylenically unsaturated monomer from (B) (vii), $R'_{12}CH=CHR'_{13}$, and is independently selected from the group consisting of vinyl 2-pyrrolidinone, vinyl N-caprolactam, and an alkyl group having from 7 to 12 carbon atoms, preferably from 8 to 11 carbon atoms.

In this embodiment, the exact amount of acidic ethylenically unsaturated monomer from (A) and ethylenically unsaturated monomer from (B) present in the water-dispersible copolymer is a matter of preference subject to such factors as the particular type of ethylenically unsaturated monomer employed, the molecular weight of the water-dispersible copolymer employed, and are particular to the end use application. In a preferred embodiment, the acidic ethylenically unsaturated monomer from (A) is present in the water-dispersible copolymer in an amount from about 10% to about 90%, preferably from about 25% to about 75%, more preferably from about 30% to about 70%, and most preferably from about 35% to about 65%, by weight. In a preferred embodiment, the ethylenically unsaturated monomer from (B) is present in the water-dispersible copolymer in an amount from about 10% to about 90%, preferably from about 25% to about 75%, more preferably from about 30% to about 70%, and most preferably from about 35% to about 65%, by weight.

In a third embodiment, the present invention is directed to an aqueous emulsion comprising a water-dispersible copolymer which is non-dispersible in aqueous solutions containing 0.5% or more of an inorganic salt, wherein the water-dispersible copolymer comprises in percentages by weight:

(A) from about 10% to about 80% of an acidic ethylenically unsaturated monomer, with the proviso that the acidic ethylenically unsaturated monomer is not acrylic acid;

(B) from about 10% to about 80% of an ethylenically unsaturated monomer selected from the group of monomer formulas consisting of:
(i) $CH_2=C(R_1)COR_2$;
(ii) $R_3OOC-CH=CH-COOR_4$;
(iii) $CH_2=C(R_5)OCOR_6$;
(iv) $CH_2=C(COOR_7)CH_2COOR_8$;
(v) $CH_3CH=CHCOOR_9$;
(vi) $R_{10}C_6H_4CR_{11}=CHR_{11}$; and
(vii) $R_{12}CH=CHR_{13}$;
wherein $R_1$ is hydrogen or methyl and $R_2$ is $-OZ'$ or $-N(Z'')(Z'')$, wherein $Z'$ is an alkyl group having from 1 to 7 carbon atoms, and $Z''$ is independently selected from the group consisting of hydrogen and alkyl groups having from 1 to 6 carbon atoms; $R_3$ and $R_4$ are independently hydrogen or an alkyl group having from 1 to 7 carbon atoms, with the proviso that $R_3$ and $R_4$ are not both hydrogen; $R_5$ is hydrogen or methyl and $R_6$ is an alkyl group having from 1 to 7 carbon atoms; $R_7$ and $R_8$ are independently hydrogen or an alkyl group having from 1 to 7 carbon atoms, with the proviso that $R_7$ and $R_8$ are not both hydrogen; $R_9$ is an alkyl group having from 1 to 7 carbon atoms; $R_{10}$ and $R_{11}$ are hydrogen; and $R_{12}$ and $R_{13}$ are independently selected from the group consisting of hydrogen, $-CN$, $-NHCHO$, and an alkyl group having from 1 to 7 carbon atoms; and (C) from about 10% to about 80% of an ethylenically unsaturated monomer selected from the group of monomer formulas consisting of:
(i) $CH_2=C(R'_1)COR'_2$;
(ii) $R'_3OOC-CH=CH-COOR'_4$;
(iii) $CH_2=C(R'_5)OCOR'_6$;
(iv) $CH_2=C(COOR'_7)CH_2COOR'_8$;
(v) $CH_3CH=CHCOOR'_9$;
(vi) $R'_{10}C_6H_4CR'_{11}=CHR'_{11}$; and
(vii) $R'_{12}CH=CHR'_{13}$;
wherein $R'_1$ is hydrogen or methyl, and $R'_2$ is selected from the group consisting of $-OZ'$, $-N(Z'')(Z'')$, and $-OZ'''OH$, wherein $Z'$ is an alkyl group having from 8 to 18 carbon atoms; $Z''$ is independently selected from the group consisting of alkyl groups having from 7 to 10 carbon atoms, dimethylamino alkyl groups having from 1 to 5 carbon atoms, and hydroxyalkyl groups having from 1 to 5 carbon atoms; and $Z'''$ is an alkyl group having from 1 to 4 carbon atoms; $R'_3$ and $R'_4$ are independently an alkyl group having from 8 to 18 carbon atoms; $R'_5$ is hydrogen or methyl and $R'_6$ is an alkyl group having from 8 to 18 carbon atoms; $R'_7$ and $R'_8$ are independently an alkyl group having from 8 to 18 carbon atoms; $R'_9$ is an alkyl group having from 8 to 18 carbon atoms; $R'_{10}$ and $R'_{11}$ are independently an alkyl group having from 1 to 2 carbon atoms; $R'_{12}$ and $R'_{13}$ are independently selected from the group consisting of 2-pyrrolidinone, N-caprolactam, and an alkyl group having from 7 to 18 carbon atoms, with the proviso that $R_{12}$ and $R_{13}$ are not both 2-pyrrolidinone, are not both N-caprolactam, or are not a mixture thereof; and the copolymer has a weight average molecular weight greater than about 25,000 and is present in an amount from about 20% to about 70%.

The acidic ethylenically unsaturated monomers from (A) in this embodiment are as defined above. The ethylenically unsaturated monomers from (B) in this embodiment selected from the group of monomer formulas consisting of (i) $CH_2=C(R_1)COR_2$; (ii) $R_3OOC-CH=CH-COOR_4$; (iii) $CH_2=C(R_5)OCOR_6$; (iv) $CH_2=C(COOR_7)CH_2COOR_8$; (v) $CH_3CH=CHCOOR_9$; (vi) $R_{10}C_6H_4CR_{11}=CHR_{11}$; and (vii) $R_{12}CH=CHR_{13}$ are as defined above. The ethylenically unsaturated monomers from (C) in this embodiment selected from the group of monomer formulas consisting of (i) $CH_2=C(R'_1)COR'_2$; (ii) $R'_3OOC-CH=CH-COOR'_4$; (iii) $CH_2=C(R'_5)OCOR'_6$; (iv) $CH_2=C(COOR'_7)CH_2COOR'_8$; (v) $CH_3CH=CHCOOR'_9$; (vi) $R'_{10}C_6H_4CR'_{11}=CHR'_{11}$; and (vii) $R'_{12}CH=CHR'_{13}$ are as defined above.

In this embodiment, the exact amount of acidic ethylenically unsaturated monomer from (A), ethylenically unsaturated monomer from (B), and ethylenically unsaturated monomer from (C) present in the water-dispersible copolymer is a matter of preference subject to such factors as the particular type of ethylenically unsaturated monomer employed, the molecular weight of the water-dispersible copolymer employed, and are particular to the end use application. In a preferred embodiment, the acidic ethylenically unsaturated monomer from (A) is present in the water-dispersible copolymer in an amount from about 10% to about 80%, preferably from about 15% to about 70%, and more preferably from about 20% to about 60%, by weight. In a preferred embodiment, the ethylenically unsaturated monomer from (B) is present in the water-dispersible copolymer in an amount from about 10% to about 80%, preferably from about 15% to about 70%, and more preferably from about 20% to about 60%, by weight. In a preferred embodiment, the ethylenically unsaturated monomer from (C) is present in the water-dispersible copolymer in an amount from about 10% to about 80%, preferably from about 15% to about 70%, more preferably from about 20% to about 60%, and most preferably from about 25% to about 50%, by weight.

When the amount of the acidic ethylenically unsaturated monomer from (A) exceeds the amounts set out above, the strength of the copolymer is insufficient when it is wet with a body fluid. When the amount of the acidic ethylenically unsaturated monomer from (A) is less than the amounts set out above, the dispersibility of the copolymer in water is insufficient. When the amount of the ethylenically unsaturated monomer from (B) or (C) exceeds the amounts set out above, the water repellency of the copolymer is increased which lowers the permeability to the liquid. When the amount of the ethylenically unsaturated monomer from (B) or (C) is less than the amounts set out above, the strength of the copolymer is insufficient when it is wet with the body fluid.

The water-dispersible copolymers of the present invention may be used as is, or may be partially neutralized to further control the solubility/dispersibility of the copolymer in water. When the degree of neutralization exceeds 50 molar %, however, the water-dispersible copolymer may be soluble even in water containing 0.5% of a salt. The method for the neutralization is not particularly limited. The polymerization can be followed by the neutralization or, alternatively, the monomer can be neutralized prior to the polymerization. The degree of neutralization of the water-dispersible copolymer is preferably not higher than 50 molar %, more preferably not higher than 40 molar %, and most preferably from about 5% to about 35 molar %. Examples of the alkalis which may be used for the neutralization include NaOH, KOH, LiOH, inorganic salts such as $Na_2CO_3$; and amines such as monoethanolamine, diethanolamine, triethanolamine, diethylaminoethanol, ammonia, trimethylamine and morpholine. Preferred alkalis for neutralization are NaOH, KOH, ammonia, ethanolamines, and combinations of an ethanolamine with NaOH or KOH.

The weight average molecular weight of the water-dispersible copolymers of the present invention is greater than about 25,000, preferably from about 25,000 to about 2,000,000, more preferably from about 25,000 to about 1,500,000, and most preferably from about 25,000 to about 1,250,000. When a polymerization terminator is used, the weight average molecular weight of the water-dispersible copolymers of the present invention may be lower, for example, greater than about 25,000, preferably from about 25,000 to about 2,000,000, more preferably from about 25,000 to about 1,500,000, and most preferably from about 25,000 to about 1,250,000. The acidic ethylenically unsaturated monomers from (A), the ethylenically unsaturated monomers from (B), and the ethylenically unsaturated monomers from (C) are present in any order.

As set out above, to further improve water dispersability, a chain transfer agent, or polymerization terminator, such as dodecyl mercaptan, may be added to reduce the molecular weight of the water-dispersible copolymer during the polymerization process. On the other hand, crosslinking agents may be employed to increase the molecular weight of the water-dispersible copolymer during the polymerization such as diallyl phthalate, diallyl amine, allyl methacrylate, ethylene glycol diacrylate, 1,6-hexane diacrylate, methylene, bisacrylamide, divinyl benzene, triallyl amine, triallyl cyanurate, and trimethylolpropane tawacrylate.

The precise formulation of the water-dispersible copolymers of the present invention will vary depending upon the specific end use. Other ingredients may also be incorporated into the copolymer composition as dictated by the nature of the desired composition as well known by those having ordinary skill in the art. Examples of additives traditionally used include plasticizers, tackifiers, thickeners, fillers, humectants, and surfactants which may be employed in conventional amounts.

Illustrative examples of plasticizers include acetyl tributyl citrate, butyl benzyl phthalate, butyl phthalyl butyl glycolate, dibutyl phthalate, dibutyl sebacate, diethyl phthalate, diethylene glycol dibenzoate, dipropylene glycol, dipropylene glycol dibenzoate, ethyl phthalyl ethyl glycolate, ethyl-p-toluene sulfonamide, hexylene glycol, methyl phthalyl ethyl glycolate, polyoxyethylene aryl ether, tributoxyethyl phthalate, triethylene glycol polyester of benzoic acid and phthalic acid. Of these plasticizers, dibenzoate types, phthalates, liquid polyesters or sulfonated types are preferred. When present, plasticizers are generally used in amounts of 2 to 20 parts by weight, preferably 3 to 15 parts.

Illustrative examples of tackifiers include coumarone-indene, ester gum, gum rosin, hydrocarbon resins, hydrogenated rosin, phenolic modified hydrocarbon resins, rosin esters, tall oil rosins, terpene phenolic, terpene resins, toluene-sulfonamide-formaldehyde resin, and wood rosin. When present, tackifiers are generally used in dispersion form at 40% to 65% solids in amounts up to about 50 parts by weight, preferably 2 to 20 parts.

Illustrative examples of thickeners include associative thickeners such as hydrophobically modified ethoxylated polyurethanes and hydrophobically modified alkali soluble emulsions, as well as alkali soluble emulsions. Other thickeners include oliginates, bentonite, casein, fumed silica, guar gum, gum tragacanth, hydroxy-ethylcellulose, locust bean gum, methylcellulose, polyacrylic acid salts (ammonium, potassium, sodium), polyvinyl alcohol, sodium carboxymethyl cellulose, and starches. When present, thickeners will be used in amounts up to about 25 parts by weight.

Illustrative examples of fillers include bentonites, calcium carbonate, calcium silicate, clay, mica, nut shell flours, silica, talc, uncooked starches, and wood flour. When present, fillers will be used in amounts up to about 20 parts by weight.

Illustrative examples of humectants include calcium chloride, diethylene glycol, glycerine, hexylene glycol, propylene glycol, magnesium chloride, sodium nitrate, sorbitol, sucrose, and urea. When present, humectants will be used in amounts up to about 20 parts by weight.

Surfactants are often employed in adhesive compositions to increase the penetrating effects of the adhesive. The surfactants may be one or more of anionic, cationic, amphoteric or nonionic surface-active compounds. Suitable anionic emulsifiers are, for example, alkyl sulfonates, alkylaryl sulfonates, alkyl sulfates, sulfates of hydroxylalkanols, alkyl and alkylaryl disulfonates, sulfonated fatty acids, sulfates and phosphates of polyethyoxylated alkanols and alkylphenols, as well as esters of sulfosuccinic acid. Suitable cationic emulsifiers are, for example, alkyl quaternary ammonium salts, and alkyl quaternary phosphonium salts. One type of suitable non-ionic emulsifier is the addition product of 5 to 50 moles of ethylene oxide adducted to straight-chain and branched-chain alkanols with 6 to 22 carbon atoms, or to alkylphenols higher fatty acids, higher fatty acid amines, or primary and secondary higher alkyl amines. Other suitable non-ionic emulsifiers are one or more block copolymers of propylene oxide with ethylene oxide. Preferred surfactants include fluorinated alkyl amphoterics or sodium dioctylsulfosuccinate. When present, the surfactant will be used in amounts of about 0.05 to 5.0 parts by weight.

The present invention is also directed to methods for preparing the water-dispersible copolymers in the above embodiments. The water-dispersible copolymers may be prepared by emulsion polymerization in water at a solids level from about 20% to about 70% in the presence of a surfactant or without a surfactant. No organic solvent is necessary. When the water-dispersible copolymer is polymerized without a surfactant, the monomers are first neutralized in water to a level from about 2% to about 15% molar of the acidic ethylenically unsaturated monomer from (A) to solubilize/disperse the monomers.

A polymerization initiator may be employed in the emulsion polymerization. Examples of the polymerization initiators include ammonium persulfate, sodium persulfate, hydrogen peroxide, t-butyl hydroperoxide, ascorbic acid, sodium formaldehyde sulfoxylate, sodium meta-bisulfite, dialkyl peroxides, peroxyesters, 2,2'-azobisisobutyronitrile, 2,2'-azobis(2methylbutyronitrile), 2,2'-azobis(2,4-dimethylvaleronitrle), 2,2'-azobis(2-amidinopropane) dihydrochloride, and 2,2'-azobis(N,N-dimethyleneisobutylamidine). The amount of the polymerization initiator ranges from about 0.01% to about 5% by weight based on the monomers. The polymerization temperature which varies depending on the selection of monomers ranges from about 30° C. to about 90° C. and the polymerization time ranges from about 1 to about 7 hours.

In a specific embodiment, the present invention is directed to a method for preparing an aqueous emulsion comprising a water-dispersible copolymer which is non-dispersible in aqueous solutions containing 0.5% or more of an inorganic salt, comprising the steps of:
(a) providing the following monomers in percentages by weight;
  (A) from about 10% to about 90% of an acidic ethylenically unsaturated monomer; and
  (B) from about 10% to about 90% of an ethylenically unsaturated monomer selected from the group of monomer formulas consisting of:
    (i) $CH_2\!=\!C(R_1)COR_2$;
    (ii) $R_3OOC\!-\!CH\!=\!CH\!-\!COOR_4$;
    (iii) $CH_2\!=\!C(R_5)OCOR_6$;
    (iv) $CH_2\!=\!C(COOR_7)CH_2COOR_8$;
    (v) $CH_3CH\!=\!CHCOOR_9$;
    (vi) $R_{10}C_6H_4CR_{11}\!=\!CHR_{11}$; and
    (vii) $R_{12}CH\!=\!CHR_{13}$;
  wherein $R_1$ is hydrogen or methyl and $R_2$ is —OZ' or —N(Z")(Z"), wherein Z' is an alkyl group having from 1 to 7 carbon atoms, and Z" is independently selected from the group consisting of hydrogen and alkyl groups having from 1 to 6 carbon atoms; $R_3$ and $R_4$ are independently hydrogen or an alkyl group having from 1 to 7 carbon atoms, with the proviso that $R_3$ and $R_4$ are not both hydrogen; $R_5$ is hydrogen or methyl and $R_6$ is an alkyl group having from 1 to 7 carbon atoms; $R_7$ and $R_8$ are independently hydrogen or an alkyl group having from 1 to 7 carbon atoms, with the proviso that $R_7$ and $R_8$ are not both hydrogen; $R_9$ is an alkyl group having from 1 to 7 carbon atoms; $R_{10}$ and $R_{11}$ are hydrogen; $R_{12}$ and $R_{13}$ are independently selected from the group consisting of hydrogen, —CN, —NHCHO, —NHCOCH$_3$, and an alkyl group having from 1 to 7 carbon atoms; and the copolymer has a weight average molecular weight greater than about 25,000 and is present in an amount from about 20% to about 70%; and
(b) emulsion polymerizing the monomers from (A) and (B) in water at a solids level from about 20% to about 70% in the presence of a surfactant.

In another specific embodiment, the present invention is directed to a method for preparing an aqueous emulsion comprising a water-dispersible copolymer which is non-dispersible in aqueous solutions containing 0.5% or more of an inorganic salt, comprising the steps of:
(a) providing the following monomers in percentages by weight;
  (A) from about 10% to about 90% of an acidic ethylenically unsaturated monomer; and
  (B) from about 10% to about 90% of an ethylenically unsaturated monomer selected from the group of monomer formulas consisting of:
    (i) $CH_2\!=\!C(R_1)COR_2$;
    (ii) $R_3OOC\!-\!CH\!=\!CH\!-\!COOR_4$;
    (iii) $CH_2\!=\!C(R_5)OCOR_6$;
    (iv) $CH_2\!=\!C(COOR_7)CH_2COOR_8$;
    (v) $CH_3CH\!=\!CHCOOR_9$;
    (vi) $R_{10}C_6H_4CR_{11}\!=\!CHR_{11}$; and
    (vii) $R_{12}CH\!=\!CHR_{13}$;
  wherein $R_1$ is hydrogen or methyl and $R_2$ is —OZ' or —N(Z")(Z"), wherein Z' is an alkyl group having from 1 to 7 carbon atoms, and Z" is independently selected from the group consisting of hydrogen and alkyl groups having from 1 to 6 carbon atoms; $R_3$ and $R_4$ are independently hydrogen or an alkyl group having from 1 to 7 carbon atoms, with the proviso that $R_3$ and $R_4$ are not both hydrogen; $R_5$ is hydrogen or methyl and $R_6$ is an alkyl group having from 1 to 7 carbon atoms; $R_7$ and $R_8$ are independently hydrogen or an alkyl group having from 1 to 7 carbon atoms, with the proviso that $R_7$ and $R_8$ are not both hydrogen; $R_9$ is an alkyl group having from 1 to 7 carbon atoms; $R_{10}$ and $R_{11}$ are hydrogen; $R_{12}$ and $R_{13}$ are independently selected from the group consisting of hydrogen, —CN, —NHCHO, —NHCOCH$_3$, and an alkyl group having from 1 to 7 carbon atoms; and the copolymer has a weight average molecular weight greater than about 25,000 and is present in an amount from about 20% to about 70%; and
(b) neutralizing the monomers from (A) and (B) in water to a level from about 2% to about 15% molar of the acidic ethylenically unsaturated monomer from (A); and
(c) emulsion polymerizing the monomers from (A) and (B) at a solids level from about 20% to about 70% without a surfactant.

In another specific embodiment, the present invention is directed to a method for preparing an aqueous emulsion comprising a water-dispersible copolymer which is non-dispersible in aqueous solutions containing 0.5% or more of an inorganic salt, comprising the steps of:
(a) providing the following monomers in percentages by weight;
  (A) from about 10% to about 90% of an acidic ethylenically unsaturated monomer; and
  (B) from about 10% to about 90% of an ethylenically unsaturated monomer selected from the group of monomer formulas consisting of:
    (i) $CH_2\!=\!C(R'_1)COR'_2$;
    (ii) $R'_3OOC\!-\!CH\!=\!CH\!-\!COOR'_4$;
    (iii) $CH_2\!=\!C(R'_5)OCOR'_6$;
    (iv) $CH_2\!=\!C(COOR'_7)CH_2COOR'_8$;
    (v) $CH_3CH\!=\!CHCOOR'_9$;
    (vi) $R'_{10}C_6H_4CR'_{11}\!=\!CHR'_{11}$; and
    (vii) $R'_{12}CH\!=\!CHR'_{13}$;
  wherein $R'_1$ is hydrogen or methyl, and $R'_2$ is selected from the group consisting of —OZ', —N(Z")(Z"), and —OZ'"OH, wherein Z' is an alkyl group having from 8 to 18 carbon atoms; Z" is independently selected from the group consisting of alkyl groups having from 7 to 10 carbon atoms, dimethylamino alkyl groups having from 1 to 5 carbon atoms, and hydroxyalkyl groups having from 1 to 5 carbon atoms; and Z'" is an alkyl group having from 1 to 4 carbon atoms; $R'_3$ and $R'_4$ are independently an alkyl group having from 8 to 18 carbon atoms; $R'_5$ is hydrogen or methyl and $R'_6$ is an alkyl group having from 8 to 18 carbon atoms; $R'_7$ and $R'_8$ are independently an alkyl group having from 8 to 18 carbon atoms; $R'_9$ is an alkyl group having from 8 to 18 carbon atoms; $R'_{10}$ and $R'_{11}$ are independently an alkyl group having from 1 to 2 carbon atoms; $R'_{12}$ and $R'_{13}$ are independently selected from the group consisting of 2-pyrrolidinone, N-caprolactam, 2-pyridine, 3-pyridine, 4-pyridine, and an alkyl group having from 7 to 18 carbon atoms, with the proviso that $R_{12}$ and $R_{13}$ are not at the same time 2-pyrrolidinone, N-caprolactam, 2-pyridine, 3-pyridine, or 4-pyridine; and the copolymer has a weight average molecular weight greater than about 25,000 and is present in an amount from about 20% to about 70%; and (b) emulsion polymerizing the monomers from (A) and (B) in water at a solids level from about 20% to about 70% in the presence of a surfactant.

In another specific embodiment, the present invention is directed to a method for preparing an aqueous emulsion comprising a water-dispersible copolymer which is non-dispersible in aqueous solutions containing 0.5% or more of an inorganic salt, comprising the steps of:

(a) providing the following monomers in percentages by weight;
  (A) from about 10% to about 90% of an acidic ethylenically unsaturated monomer; and
  (B) from about 10% to about 90% of an ethylenically unsaturated monomer selected from the group of monomer formulas consisting of:
    (i) $CH_2=C(R'_1)COR'_2$;
    (ii) $R'_3OOC-CH=CH-COOR'_4$;
    (iii) $CH_2=C(R'_5)OCOR'_6$;
    (iv) $CH_2=C(COOR'_7)CH_2COOR'_8$;
    (v) $CH_3CH=CHCOOR'_9$;
    (vi) $R'_{10}C_6H_4CR'_{11}=CHR'_{11}$; and
    (vii) $R'_{12}CH=CHR'_{13}$;
    wherein $R'_1$ is hydrogen or methyl, and $R'_2$ is selected from the group consisting of —OZ', —N(Z")(Z"), and —OZ'"OH, wherein Z' is an alkyl group having from 8 to 18 carbon atoms; Z" is independently selected from the group consisting of alkyl groups having from 7 to 10 carbon atoms, dimethylamino alkyl groups having from 1 to 5 carbon atoms, and hydroxyalkyl groups having from 1 to 5 carbon atoms; and Z'" is an alkyl group having from 1 to 4 carbon atoms; $R'_3$ and $R'_4$ are independently an s alkyl group having from 8 to 18 carbon atoms; $R'_5$ is hydrogen or methyl and $R'_6$ is an alkyl group having from 8 to 18 carbon atoms; $R'_7$ and $R'_8$ are independently an alkyl group having from 8 to 18 carbon atoms; $R'_9$ is an alkyl group having from 8 to 18 carbon atoms; $R'_{10}$ and $R'_{11}$ are independently an alkyl group having from 1 to 2 carbon atoms; $R'_{12}$ and $R'_{13}$ are independently selected from the group consisting of 2-pyrrolidinone, N-caprolactam, 2-pyridine, 3-pyridine, 4-pyridine, and an alkyl group having from 7 to 18 carbon atoms, with the proviso that $R_{12}$ and $R_{13}$ are not at the same time 2-pyrrolidinone, N-caprolactam, 2-pyridine, 3-pyridine, or 4-pyridine; and the copolymer has a weight average molecular weight greater than about 25,000 and is present in an amount from about 20% to about 70%; and (b) neutralizing the monomers from (A) and (B) in water to a level from about 2% to about 15% molar of the acidic ethylenically unsaturated monomer from (A); and (c) emulsion polymerizing the monomers from (A) and (B) at a solids level from about 20% to about 70% without a surfactant.

In another specific embodiment, the present invention is directed to a method for preparing an aqueous emulsion comprising a water-dispersible copolymer which is non-dispersible in aqueous solutions containing 0.5% or more of an inorganic salt, comprising the steps of:

(a) providing the following monomers in percentages by weight;
  (A) from about 10% to about 80% of an acidic ethylenically unsaturated monomer;
  (B) from about 10% to about 80% of an ethylenically unsaturated monomer selected from the group of monomer formulas consisting of:
    (i) $CH_2=C(R_1)COR_2$;
    (ii) $R_3OOC-CH=CH-COOR_4$;
    (iii) $CH_2=C(R_5)OCOR_6$;
    (iv) $CH_2=C(COOR_7)CH_2COOR_8$;
    (v) $CH_3CH=CHCOOR_9$;
    (vi) $R_{10}C_6H_4CR_{11}=CHR_{11}$; and
    (vii) $R_{12}CH=CHR_{13}$;
    wherein $R_1$ is hydrogen or methyl and $R_2$ is —OZ' or —N(Z")(Z"), wherein Z' is an alkyl group having from 1 to 7 carbon atoms, and Z" is independently selected from the group consisting of hydrogen and alkyl groups having from 1 to 6 carbon atoms; $R_3$ and $R_4$ are independently hydrogen or an alkyl group having from 1 to 7 carbon atoms, with the proviso that $R_3$ and $R_4$ are not both hydrogen; $R_5$ is hydrogen or methyl and $R_6$ is an alkyl group having from 1 to 7 carbon atoms; $R_7$ and $R_8$ are independently hydrogen or an alkyl group having from 1 to 7 carbon atoms, with the proviso that $R_7$ and $R_8$ are not both hydrogen; $R_9$ is an alkyl group having from 1 to 7 carbon atoms; $R_{10}$ and $R_{11}$ are hydrogen; and $R_{12}$ and $R_{13}$ are independently selected from the group consisting of hydrogen, —CN, —NHCHO, and an alkyl group having from 1 to 7 carbon atoms; and
  (C) from about 10% to about 80% of an ethylenically unsaturated monomer selected from the group of monomer formulas consisting of:
    (i) $CH_2=C(R'_1)COR'_2$;
    (ii) $R'_3OOC-CH=CH-COOR'_4$;
    (iii) $CH_2=C(R'_5)OCOR'_6$;
    (iv) $CH_2=C(COOR'_7)CH_2COOR'_8$;
    (v) $CH_3CH=CHCOOR'_9$;
    (vi) $R'_{10}C_6H_4CR'_{11}=CHR'_{11}$; and
    (vii) $R'_{12}CH=CHR'_{13}$;
    wherein $R'_1$ is hydrogen or methyl, and $R'_2$ is selected from the group consisting of —OZ', —N(Z")(Z"), and —OZ'"OH, wherein Z' is an alkyl group having from 8 to 18 carbon atoms; Z" is independently selected from the group consisting of alkyl groups having from 7 to 10 carbon atoms, dimethylamino alkyl groups having from 1 to 5 carbon atoms, and hydroxyalkyl groups having from 1 to 5 carbon atoms; and Z'" is an alkyl group having from 1 to 4 carbon atoms; $R'_3$ and $R'_4$ are independently an alkyl group having from 8 to 18 carbon atoms; $R'_5$ is hydrogen or methyl and $R'_6$ is an alkyl group having from 8 to 18 carbon atoms; $R'_7$ and $R'_8$ are independently an alkyl group having from 8 to 18 carbon atoms; $R'_9$ is an alkyl group having from 8 to 18 carbon atoms; $R'_{10}$ and $R'_{11}$ are independently an alkyl group having from 1 to 2 carbon atoms; $R'_{12}$ and $R'_{13}$ are independently selected from the group consisting of 2-pyrrolidinone, N-caprolactam, and an alkyl group having from 7 to 18 carbon atoms, with the proviso that $R_{12}$ and $R_{13}$ are not both 2-pyrrolidinone, are not both N-caprolactam, or are not a mixture thereof; and the copolymer has a weight average molecular weight greater than about 25,000 and is present in an amount from about 20% to about 70%; and (b) emulsion polymerizing the monomers from (A), (B), and (C) in water at a solids level from about 20% to about 70% in the presence of a surfactant.

In another specific embodiment, the present invention is directed to a method for preparing an aqueous emulsion comprising a water-dispersible copolymer which is non-dispersible in aqueous solutions containing 0.5% or more of an inorganic salt, comprising the steps of:

(a) providing the following monomers in percentages by weight;
  (A) from about 10% to about 80% of an acidic ethylenically unsaturated monomer;
  (B) from about 10% to about 80% of an ethylenically unsaturated monomer selected from the group of monomer formulas consisting of:
    (i) $CH_2=C(R_1)COR_2$;
    (ii) $R_3OOC-CH=CH-COOR_4$;
    (iii) $CH_2=C(R_5)OCOR_6$;
    (iv) $CH_2=C(COOR_7)CH_2COOR_8$;
    (v) $CH_3CH=CHCOOR_9$;
    (vi) $R_{10}C_6H_4CR_{11}=CHR_{11}$; and
    (vii) $R_{12}CH=CHR_{13}$;
    wherein $R_1$ is hydrogen or methyl and $R_2$ is $-OZ'$ or $-N(Z'')(Z'')$, wherein $Z'$ is an alkyl group having from 1 to 7 carbon atoms, and $Z''$ is independently selected from the group consisting of hydrogen and alkyl groups having from 1 to 6 carbon atoms; $R_3$ and $R_4$ are independently hydrogen or an alkyl group having from 1 to 7 carbon atoms, with the proviso that $R_3$ and $R_4$ are not both hydrogen; $R_5$ is hydrogen or methyl and $R_6$ is an alkyl group having from 1 to 7 carbon atoms; $R_7$ and $R_8$ are independently hydrogen or an alkyl group having from 1 to 7 carbon atoms, with the proviso that $R_7$ and $R_8$ are not both hydrogen; $R_9$ is an alkyl group having from 1 to 7 carbon atoms; $R_{10}$ and $R_{11}$ are hydrogen; and $R_{12}$ and $R_{13}$ are independently selected from the group consisting of hydrogen, $-CN$, $-NHCHO$, and an alkyl group having from 1 to 7 carbon atoms; and
  (C) from about 10% to about 80% of an ethylenically unsaturated monomer selected from the group of monomer formulas consisting of:
    (i) $CH_2=C(R'_1)COR'_2$;
    (ii) $R'_3OOC-CH=CH-COOR'_4$;
    (iii) $CH_2=C(R'_5)OCOR'_6$;
    (iv) $CH_2=C(COOR'_7)CH_2COOR'_8$;
    (v) $CH_3CH=CHCOOR'_9$;
    (vi) $R'_{10C6}H_4CR'_{11}=CHR'_{11}$; and
    (vii) $R'_{12}CH=CHR'_{13}$;
    wherein $R'_1$ is hydrogen or methyl, and $R'_2$ is selected from the group consisting of $-OZ'$, $-N(Z'')(Z'')$, and $-OZ'''OH$, wherein $Z'$ is an alkyl group having from 8 to 18 carbon atoms; $Z''$ is independently selected from the group consisting of alkyl groups having from 7 to 10 carbon atoms, dimethylamino alkyl groups having from 1 to 5 carbon atoms, and hydroxyalkyl groups having from 1 to 5 carbon atoms; and $Z'''$ is an alkyl group having from 1 to 4 carbon atoms; $R'_3$ and $R'_4$ are independently an alkyl group having from 8 to 18 carbon atoms; $R'_5$ is hydrogen or methyl and $R'_6$ is an alkyl group having from 8 to 18 carbon atoms; $R'_7$ and $R'_8$ are independently an alkyl group having from 8 to 18 carbon atoms; $R'_9$ is an alkyl group having from 8 to 18 carbon atoms; $R'_{10}$ and $R'_{11}$ are independently an alkyl group having from 1 to 2 carbon atoms; $R'_{12}$ and $R'_{13}$ are independently selected from the group consisting of 2-pyrrolidinone, N-caprolactam, and an alkyl group having from 7 to 18 carbon atoms, with the proviso that $R_{12}$ and $R_{13}$ are not both 2-pyrrolidinone, are not both N-caprolactam, or are not a mixture thereof; and the copolymer has a weight average molecular weight greater than about 25,000 and is present in an amount from about 20% to about 70%; and (b) neutralizing the monomers from (A), (B), and (C) in water to a level from about 2% to about 15% molar of the acidic ethylenically unsaturated monomer from (A); and (c) emulsion polymerizing the monomers from (A), (B), and (C) at a solids level from about 20% to about 70% without a surfactant.

Throughout this application, various publications have been referenced. The disclosures in these publications are incorporated herein by reference in order to more fully describe the state of the art.

Throughout this disclosure, applicant will suggest various theories or mechanisms by which applicant believes the components in the adhesive compositions function together in an unexpected manner to provide unique waterborne hot melt agents. While applicant may offer various mechanisms to explain the present invention, applicant does not wish to be bound by theory. These theories are suggested to better understand the present invention but are not intended to limit the effective scope of the claims.

The present invention is further illustrated by the following examples which are presented for purposes of demonstrating, but not limiting, the preparation of the compounds and compositions of this invention.

EXAMPLE

Example 1 (Surfactant Process)

A quantity of 382.0 grams of deionized water and 5.7 grams Abex EP-120 were added to a 2-L four-neck flask equipped with a condenser, thermometer and stainless steel paddle agitator. The pH was adjusted to 2.5 with sulfuric acid, and the solution was stirred and purged with a gentle stream of nitrogen for 30 minutes. Next, a solution of 10 grams deionized water and 1.0 gram ammonium persulfate was added. Then 100.0 grams of deionized water and 11.4 grams Abex EP-120 were mixed and to that solution were added 120.0 grams methacrylic acid, 50.0 grams butyl acrylate, 30.0 grams 2-ethylhexyl acrylate, and 0.6 grams dodecyl mercaptan. The reaction mixture was heated to 80° C. with a water bath, and at 80° C., the monomer preemulsion was added over 2.5 hours via monomer pump, and the reaction was held at 80° C. for 30 minutes after all of the monomer was added. The resulting emulsion was 29.7% solids with a pH of 2.2, a viscosity of 85 cPs, and an average particle size of 82 nm. The polymer was soluble in alkali, and dried films dispersed in tap water, but were insoluble in 3% salt solutions.

Example 2

The polymerization was conducted in the same manner as Example 1 except that 50 grams of butyl acrylate and 50 grams methacrylic acid were used as the monomers. The resulting emulsion was 28.3% solids with a pH of 2.2, a viscosity of 10 cPs, and an average particle size of 78 nm. The polymer was soluble in alkali, and dried films dispersed in tap water, but were insoluble in 3% salt solutions.

Example 3

The polymerization was conducted in the same manner as Example 1 except that 50 grams of 2-ethylhexyl acrylate and 50 grams methacrylic acid were used as the monomers. The resulting emulsion was 27.3% solids with a pH of 2.1, a viscosity of 26 cPs, and an average particle size of 102 nm. The polymer was soluble in alkali, and dried films dispersed in tap water but were insoluble in 3% salt solutions

Example 4

The polymerization was conducted in the same manner as Example 1 except that 50 grams methacrylic acid, 30 grams butyl acrylate, 20 grams 2-ethylhexyl acrylate, and 10 grams maleic anhydride were used as the monomers. The resulting emulsion was 27.6% solids with a pH of 1.4, and a viscosity of 36 cPs. the polymer was soluble in alkali, and dried films dispersed in tap water, but were insoluble in 3% salt solutions.

Example 5

The polymerization was conducted in the same manner as Example 1 except that 50 grams methacrylic acid, 30 grams butyl acrylate, 20 grams 2-ethylhexyl acrylate, and 10 grams vinyl acetate were used as the monomers. The resulting emulsion was 30.3% solids with a pH of 2.1, and a viscosity of 12 cPs, The polymer was soluble in alkali, and dried films dispersed in tap water, but were insoluble in 3% salt solutions.

Example 6

The polymerization was conducted in the same manner as Example 1 except that 50 grams methacrylic acid, 30 grams butyl acrylate, 20 grams 2-ethylhexyl acrylate, and 10 grams monooctyl maleate were used as the monomers. The resulting emulsion was 30.0% solids with a pH of 1.6, and a viscosity of 12 cPs. The polymer was soluble in alkali, and dried films dispersed in tap water, but were insoluble in 3% salt solutions.

Example 7

The polymerization was conducted in the same manner as Example 1 except that 50 grams methacrylic acid, 30 grams butyl acrylate, 20 grams 2-ethylhexyl acrylate, and 10 grams itaconic acid were used as the monomers. The resulting emulsion was 25.6% solids with a pH of 2.1, and a viscosity of 12 cPs. The polymer was soluble in alkali, and dried films dispersed in tap water, but were insoluble in 3% salt solutions.

Example 8

The polymerization was conducted in the same manner as Example 1 except that 50 grams methacrylic acid, 30 grams butyl acrylate, 20 grams 2-ethylhexyl acrylate, and 5 grams 2-acrylamido-2-methylpropane sulfonic acid were used as the monomers. The resulting emulsion was 25:6% solids with a pH of 2.1, and a viscosity of 12 cPs. The polymer was soluble in alkali, and dried films dispersed in tap water, but were insoluble in 3% salt solutions.

Example 9

A quantity of 388.5 grams of deionized water, 3.0 grams Aerosol A-102 and 3.0 grams Rhodasurf L-4 were added to a 2-L four-neck flask equipped with a condenser, thermometer and stainless steel paddle agitator. The solution was stirred and purged with a gentle stream of nitrogen for 30 minutes. Next, 300.0 grams of deionized water, 3.0 grams Rhodasurf L-4, and 3.0 grams Aerosol A-102 were mixed and to that solution were added 162.0 grams methacrylic acid, 8.0 grams acrylic acid, 75.0 grams butyl acrylate, 15.0 grams methyl methacrylate, and 0.3 grams dodecyl mercaptan. Then 30.0 grams of this monomer emulsion was added to the initial charge, and the mixture was heated to 80° C. with a water bath. At 76° C. a solution of 15 grams deionized water and 1.5 grams ammonium persulfate was added. The reaction mixture was allowed to react for 5 minutes, then the monomer pre-emulsion was added over 2.5 hours via monomer pump, and the reaction was held at 80° C. for 15 minutes after all of the monomer was added. The resulting emulsion was 29.5 solids with a pH of 2.1 a viscosity of 13.5 cPs and an average particle size of 117 nm. The polymer was soluble in alkali, and dried films dispersed in tap water, but were insoluble in 3% salt solutions.

Example 10

Films from above examples were cast and air dried. Next, 1.0 gram was placed in a flask with 100.0 grams tap water. The solution was stirred for 1 hour, then filtered and the % solids was determined on the filtrate to calculate the % insoluble polymer. The results are tabulated below:

Salt Sensitivity of Selected Latexes

|  | % Insoluble in Tap Water | % Insoluble in 3% NaCl |
| --- | --- | --- |
| Example 1 | 15.9% | 96.7% |
| Example 2 | 0.0% | 100% |
| Example 3 | 46.2% | 100% |
| Example 5 | 10.2% | 100% |
| Example 7 | 8.2% | 100% |
| Example 8 | 7.4% | 92.0% |
| Example 9 | 5.7% | 95.1% |

Example 11 (In-situ Colloid Process, No Surfactant)

A quantity of 675.0 grams deionized water and 4.89 grams ammonium hydroxide were added to a 2-L four-neck flask equipped with a condenser, thermometer and stainless steel paddle agitator. The solution was stirred and purged with a gentle stream of nitrogen for 30 minutes. Next, 6.0 grams of acrylic acid and 0.6 grams of dodecyl mercaptan were added, and the mixture was heated to 80° C. with a water bath. At 75° C., a solution of 15.0 grams deionized water and 1.5 grams ammonium persulfate was added and the reaction was allowed to heat to 80° C. At 80° C., a quantity of 180.0 grams methacrylic acid, 75.0 grams butyl acrylate, and 45.0 grams 2-ethylhexyl acrylate, were added over 2.5 hours via monomer pump. The resulting emulsion was 29.7% solids with a pH of 4.0, and a viscosity of 136 cPs.

Example 12

The polymerization was conducted in the same manner as Example 11 except the monomer slow addition composition was 30 grams methacrylic acid, 40 grams butyl acrylate, and 30 grams 2-ethylhexyl acrylate. The resulting emulsion was 29.6% solids with a pH of 4.6, and a viscosity of 14 cPs. The polymer was soluble in alkali, and dried films dispersed in tap water, but were insoluble in 3% salt solutions. The polymer was also a film former at room temperature.

Example 13

The polymerization was conducted in the same manner as Example 11 except the monomer slow addition composition was 30 grams methacrylic acid and 70 grams butyl acrylate. The resulting emulsion was 29.5% solids with a pH of 4.4, and a viscosity of 348 cPs. The polymer was soluble in alkali, and dried films dispersed In tap water, but were insoluble in 3% salt solutions. The polymer was also a film former at room temperature.

Example 14

The polymerization was conducted in the same manner as Example 11 except the monomer slow addition composition was 30 grams methacrylic acid, and 70 grams 2-ethylhexyl acrylate. The resulting emulsion was 29.6% solids with a pH of 4.4, and a viscosity of 210 cPs. The polymer was soluble in alkali, and dried films dispersed in tap water, but were insoluble in 3% salt solutions. The polymer was also a film former at room temperature.

Example 15

The polymerization was conducted in the same manner as Example 11 except the monomer slow addition composition was 60 grams methacrylic acid, 25 grams butyl acrylate, 15 grams 2-ethylhexyl acrylate, and 10 grams maleic anhydride. The resulting emulsion was 29.2% solids with a pH of 1.7, and a viscosity of 12 cPs. The polymer was soluble in alkali, and dried films dispersed in tap water, but were insoluble in 3% salt solutions.

Example 16

The polymerization was conducted in the same manner as Example 11 except the monomer slow addition composition was 60 grams methacrylic acid, 25 grams butyl acrylate, 15 grams 2-ethylhexyl acrylate, and 10 grams vinyl acetate. The resulting emulsion was 29.4% solids with a pH of 2.2, and a viscosity of 10 cPs. The polymer was soluble in alkali, and dried films dispersed in tap water, but were insoluble in 3% salt solutions.

Example 17

The polymerization was conducted in the same manner as Example 11 except the monomer slow addition composition was 60 grams methacrylic acid, 25 grams butyl acrylate, 15 grams 2-ethylhexyl acrylate, and 10 grams monooctyl relegate. The resulting emulsion was 29.7% solids with a pH of 4.0, and a viscosity of 14 cPs. The polymer was soluble in alkali, and dried films dispersed in tap water, but were insoluble in 3% salt solutions.

Example 18

The polymerization was conducted in the same manner as Example 11 except the monomer slow addition composition was 40 grams methacrylic acid, 50 grams vinyl acetate, and 10 grams monooctyl maleate. The resulting emulsion was 24.5% solids with a pH of 4.0, and a viscosity of 2140 cPs. The polymer was soluble in alkali, and dried films dispersed in tap water, but were insoluble in 3% salt solutions. The polymer was also a film former at room temperature.

Example 19

The polymerization was conducted in the same manner as Example 11 except the monomer slow addition composition was 60 grams acrylic acid, 25 grams butyl acrylate, 15 grams 2ethylhexyl acrylate, and 6 grams 2-acrylamido-2-methylpropane sulfonic acid. The resulting emulsion was 29.8% solids with a pH of 1.8, and a viscosity of 2680 cPs. The polymer was soluble in alkali, and dried films dispersed in tap water, but were insoluble in 3% salt solutions. The polymer was also a film former at room temperature.

Example 20

The polymerization was conducted in the same manner as Example 11 except the monomer slow addition composition was 30 grams acrylic acid, 50 grams methacrylic acid, 25 grams butyl acrylate, and 15 grams 2-ethylhexyl acrylate The resulting emulsion was 29.7% solids with a pH of 3.5, and a viscosity of 1020 cPs. The polymer was soluble in alkali, and dried films dispersed in tap water, but were insoluble in 3% salt solutions. The polymer was also a film former at room temperature.

Example 21

A quantity of 742.0 grams deionized water and 1.0 grams ammonium hydroxide were added to a 2-L four-neck flask equipped with a condenser, thermometer and stainless steel paddle agitator. The solution was stirred and purged with a gentle stream of nitrogen for 30 minutes.

Next, 6.0 grams of methacrylic acid and 0.15 grams of dodecyl mercaptan were added, and the mixture was heated to 80° C. with a water bath. At 75° C., a solution of 15.0 grams deionized water and 1.5 grams ammonium persulfate was added and the reaction was allowed to heat to 80° C. At 80° C., a quantity of 172.0 grams methacrylic acid, 80.0 grams butyl acrylate, 15.0 grams monooctyl maleate, 48.0 methyl methacrylate, and 0.15 dodecyl mercaptan were added over 2.5 hours via monomer pump. The resulting emulsion was 30.1% solids with a pH of 2.8, and a viscosity of 32 cPs.

Example 22

The polymerization was conducted in the same manner as Example 21 except the monomer slow addition composition was 60 grams methacrylic acid, 25 grams butyl acrylate, 15 grams methyl methacrylate and 5 grams of the ammonium salt of 2-acrylamido-2-methylpropane sulfonic acid. The resulting latex was 30.0% solids with a pH of 3.5 and a viscosity of 56 cPs. The polymer was soluble in alkali, and dried films dispersed in tap water but were insoluble in 3% salt solutions.

Example 23

Films from the above examples were cast and air-dried. Next, 1.0 gram was placed in a flask with 100.0 grams tap water. The solution was stirred for 1 hour, then filtered and % solids were determined on the filtrate to calculate the % insoluble polymer. The results are tabulated below:

|  | % Insoluble in Tap Water | % Insoluble in 3% NaCl |
| --- | --- | --- |
| Example 10 | 20.9% | 81.6% |
| Example 11 | 21.5% | 23.6% |
| Example 12 | 16.9% | 20.6% |
| Example 13 | 9.8% | 39.8% |
| Example 14 | 19.9% | 66.0% |
| Example 15 | 15.9% | 47.0% |
| Example 20 | 2.3% | 100% |

Higher solids latexes can be prepared with conventional techniques, however ultra-high solids using techniques outlined in U.S. Pat. No. 6,001,916 can also be utilized. This patent demonstrates that low viscosity, high solids emulsions (>65%) can be formed by the use of a broad particle size distribution and/or seed emulsions in the initial charge.

Example 24 (High Solids)

The polymerization was conducted in the same manner as Example 1 except that 60 grams of methacrylic acid, 15 grams methyl methacrylate, and 25 grams butyl acrylate were used as the monomers. The theoretical solids of this emulsion is 55%.

Example 25

The polymerization was conducted in the same manner as Example 1 except that 60 grams of methacrylic acid, 15 grams methyl methacrylate, and 25 grams butyl acrylate were used as the monomers. These monomers were polymerized in an initial charge which contained a 50% solids polymer made via example 22 instead of water to increase the solids content. The theoretical solids of this emulsion is 65%.

Example 26

Films from several examples of water-dispersible copolymers were cast and air-dried. Next, 1.0 gram was placed in a flask with 100.0 grams tap water. The solution was stirred for 1 hour, then filtered and % solids were determined on the filtrate to calculate the % insoluble polymer. The results are tabulated below:

| Monomer Composition | Surfactant | Substrate | Solubility Tap 3% NaCl |
|---|---|---|---|
| 60 MAA/25 BA/15 2EHA | Yes | Glass, Hair, Wood | Yes No |
| 60 MAA/25 BA/15 2EHA | No | Glass, Hair, Wood | Yes No |
| 50 MAA/30 BA/20 2EHA | Yes | Glass | Yes No |
| 30 MAA/40 BA/30 2EHA | No | Glass | Yes No |
| 60 MAA/25 BA/15 2EHA/5 VA | Yes | Glass | Yes No |
| 60 MAA/25 BA/15 2EHA/5 VA | No | Glass | Yes No |
| 60 MAA/25 BA/15 2EHA/5 MOM | Yes | Glass | Yes No |
| 60 MAA/25 BA/15 2EHA/5 MOM | No | Glass | Yes No |
| 60 MAA/25 BA/15 2EHA/5 MAH | Yes | Glass | Yes No |
| 60 MAA/25 BA/15 2EHA/5 MAH | No | Glass | Yes No |
| 60 MAA/25 BA/15 2EHA/5 AMPS | Yes | Glass | Yes No |
| 60 MAA/25 BA/15 2EHA/5 AMPS | No | Glass | Yes No |
| 50 VA/50 MOM | No | Glass | No No |
| 40 VA/10 MOM/30 MAA | No | Glass | Yes No |
| 70 MAA/20 BA/10 2EHA | Yes | Glass | Yes No |
| 70 MAA/20 BA/10 2EHA | No | Glass | Yes No |
| 60 MAA/25 BA/15 MMA | Yes | Glass | Yes No |
| 60 MAA/25 BA/15 MMA | No | Glass | Yes No |
| 60 MAA/25 BA/15 MMA/5 AMPS | Yes | Glass | Yes No |
| 60 MAA/25 BA/15 MMA/5 AMPS | No | Glass | Yes No |
| 54 MAA/6 AA/25 BA/15 MMA | Yes | Glass | Yes No |
| 54 MAA/6 AA/25 BA/15 MMA | No | Glass | Yes No |
| 54 MAA/6 AA/25 BA/15 MMA/5 MOM | Yes | Glass | Yes No |
| 54 MAA/6 AA/25 BA/15 MMA/5 MOM | No | Glass | Yes No |

In the Table above, the following abbreviations have the meaning set out below.

AA—acrylic acid
MM—methacrylic acid
MMA—methyl methacrylate
BA—butyl acrylate
2EHA—2-ethylhexyl acrylate
AMPS—ammonium salt of 2-acrylamido-2-methylpropane sulfonic acid
MOM—monooctyl maleate
VA—vinyl acetate
MAH—maleic anhydride While a number of embodiments of this invention have been represented, it is apparent that the basic construction can be altered to provide other embodiments which utilize the invention without departing from the spirit and scope of the invention. All such modifications and variations are intended to be included within the scope of the invention as defined in the appended claims rather than the specific embodiments which have been presented by way of example.

I claim:

1. An aqueous emulsion comprising a water-dispersible copolymer characterized in that films formed from said water-dispersible copolymer are dispersible in water, yet non-dispersible in aqueous solutions containing 0.5% by weight or more of an inorganic salt, and wherein the water-dispersible copolymer comprises in percentages by weight:

(A) from about 25% to about 80% of acidic ethylenically unsaturated monomer units, with the proviso that the acidic ethylenically unsaturated monomer units are not acrylic acid;

(B) from about 10% to about 80% of ethylenically unsaturated monomer units selected from the group of monomer formulas consisting of:
(i) $CH_2=C(R_1)COR_2$;
(i) $R_3OOC-CH=CH-COOR_4$;
(iii) $CH_2=C(R_5)OCOR_6$;
(iv) $CH_2=C(COOR_7)CH_2COOR_8$;
(v) $CH_3CH=CHCOOR_9$;
(vi) $R_{10}C_6H_4CR_{11}=CHR_{11}$; and
(vii) $R_{12}CH=CHR_{13}$;

wherein $R_1$ is hydrogen or methyl and $R_2$ is —OZ' or —N(Z")(Z"), wherein Z' is an alkyl group having from 1 to 7 carbon atoms, and Z" is independently selected from the group consisting of hydrogen and alkyl groups having from 1 to 6 carbon atoms; $R_3$ and $R_4$ are independently hydrogen or an alkyl group having from 1 to 7 carbon atoms, with the proviso that $R_3$ and $R_4$ are not both hydrogen; $R_5$ is hydrogen or methyl and $R_6$ is an alkyl group having from 1 to 7 carbon atoms; $R_7$ and $R_8$ are independently hydrogen or an alkyl group having from 1 to 7 carbon atoms, with the proviso that $R_7$ and $R_8$ are not both hydrogen; $R_9$ is an alkyl group having from 1 to 7 carbon atoms; $R_{10}$ and $R_{11}$ are hydrogen; and $R_{12}$ and $R_{13}$ are independently selected from the group consisting of hydrogen, —CN, —NHCHO, and an all group having from 1 to 7 carbon atoms; and (C) from about 10% to about 80% of ethylenically unsaturated monomer units selected from the group of monomer formulas consisting of;
(i) $CH_2=C(R'_1)COR'_2$;
(ii) $R'_3OOC-CH=CH-COOR'_4$;
(iii) $CH_2=C(R'_5)OCOR'_6$;
(iv) $CH_2=C(COOR'_7)CH_2COOR'_8$;
(v) $CH_3CH=CHCOOR'_9$;
(vi) $R'_{10}C_6H_4CR'_{11}=CHR'_{11}$; and
(vii) $R'_{12}CH=CHR'_{13}$;

wherein $R'_1$ is hydrogen or methyl, and $R'_2$ is selected from the group consisting of —OZ', —N(Z")(Z"), and —OZ'''OH, wherein Z' is an alkyl group having from 8 to 18 carbon atoms; Z'' is independently selected from the group consisting of alkyl groups having from 7 to 10 carbon atoms, dimethylamino alkyl groups having from 1 to 5 carbon atoms, and hydroxyalkyl groups having from 1 to 5 carbon atoms; and Z''' is an alkyl group having from 1 to 4 carbon atoms; $R'_3$ and $R'_4$ are independently an alkyl group having from 8 to 18 carbon atoms; $R'_5$ is hydrogen or methyl and $R'_6$ is an alkyl group having from 8 to 18 carbon atoms; $R'_7$ and $R'_8$ are independently an alkyl group having from 8 to 18 carbon atoms; $R'_9$ is an alkyl group having from 8 to 18 carbon atoms; $R'_{10}$ and $R'_{11}$ are independently an alkyl group having from 1 to 2 carbon atoms; $R'_{12}$ and $R'_{13}$ are independently selected from the group consisting of 2-pyrrolidinone, N-caprolactam, and an alkyl group having from 7 to 18 carbon atoms, with the proviso that $R_{12}$ and $R_{13}$ are not both 2-pyrrolidinone, are not both N-caprolactam, or are not a mixture thereof; and the copolymer has a weight average molecular weight greater than about 25,000 and is present in an amount from about 20% to about 70% by weight, based on the aqueous emulsion.

2. The aqueous emulsion according to claim 1, wherein the acidic ethylenically unsaturated monomer from (A) contains a carboxylic acid group and is selected from the group consisting of methacrylic acid, maleic acid, maleic acid half esters, maleic anhydride, itaconic acid, and crotonic acid.

3. The aqueous emulsion according to claim 1, wherein the acidic ethylenically unsaturated monomer from (A) contains a sulfonic acid group and is selected from the group consisting of styrene sulfonic acid, and 2-acrylamido-2-methylpropane sulfonic acid.

4. The aqueous emulsion according to claim 1, wherein the acidic ethylenically unsaturated monomer from (A) contains a phosphoric acid group and is selected from the group consisting of styrene phosphoric acid, and $CH_2=C(CH_3)COO(CH_2)_nOPO_3H$, wherein n is from 2 to 4.

5. The aqueous emulsion according to claim 1, wherein the ethylenically unsaturated monomer from (B) is (i) $CH_2=C(R_1)COR_2$, wherein $R_1$ is methyl and $R_2$ is $-OZ'_1$ wherein Z' is an alkyl group having from 1 to 4 carbon atoms.

6. The aqueous emulsion according to claim 1, wherein the ethylenically unsaturated monomer from (B) is (ii) $R_3OOC-CH=CH-COOR_4$, wherein $R_3$ and $R_4$ are independently an alkyl group having from 2 to 4 carbon atoms.

7. The aqueous emulsion according to claim 1, wherein the ethylenically unsaturated monomer from (B) is (iii) $CH_2=C(R_5)OCOR_6$, wherein $R_5$ is methyl and $R_6$ is an alkyl group having from 1 to 4 carbon atoms.

8. The aqueous emulsion according to claim 1, wherein the ethylenically unsaturated monomer from (B) is (iv) $CH_2=C(COOR_7)CH_2COOR_6$, wherein $R_7$ and $R_8$ are independently an alkyl group having from 2 to 4 carbon atoms.

9. The aqueous emulsion according to claim wherein the ethylenically unsaturated monomer from (B) is (v) $CH_3CH=CHCOOR_9$, wherein $R_9$ is an alkyl group having from 2 to 4 carbon atoms.

10. The aqueous emulsion according to claim 1, wherein the ethylenically unsaturated monomer from (B) is (vi) $R_{10}C_6H_4CR_{11}=CHR_{11}$, wherein $R_{10}$ and $R_{11}$ are hydrogen.

11. The aqueous emulsion according to claim 1, wherein the ethylenically unsaturated monomer from (B) is (vii) $R_{12}CH=CHR_{13}$, wherein $R_{12}$ and $R_{13}$ are independently hydrogen or methyl.

12. The aqueous emulsion according to claim 1, wherein the ethylenically unsaturated monomer from (C) is (i) $CH_2=C(R'_1)COR'_2$, wherein $R'_1$ is methyl, $R'_2$ is selected from the group consisting of —OZ', —N(Z'')(Z''), and —OZ'''OH, wherein Z' is an alkyl group having from 8 to 12 carbon atoms; Z'' is independently selected from the group consisting of alkyl groups having from 8 to 10 carbon atoms, dimethylamino alkyl groups having from 1 to 3 carbon atoms, and hydroxyalkyl groups having from 1 to 3 carbon atoms; and Z''' is an alkyl group having from 1 to 2 carbon atoms.

13. The aqueous emulsion according to claim 1, wherein the ethylenically unsaturated monomer from (C) is (ii) $R'_3OOC-CH=CHCOOR'_4$, wherein $R'_3$ and $R'_4$ are independently an alkyl group having from 8 to 12 carbon atoms.

14. The aqueous emulsion according to claim 1, wherein the ethylenically unsaturated monomer from (C) is (iii) $CH_2=C(R'_5)OCOR'_6$, wherein $R'_5$ is methyl, and $R'_6$ is an alkyl group having from 8 to 12 carbon atoms.

15. The aqueous emulsion according to claim 1, wherein the ethylenically unsaturated monomer from (C) is (iv) $CH_2=C(COOR'_7)CH_2COOR'_6$, wherein $R'_7$ and $R'_5$ are independently an alkyl group having from 8 to 12 carbon atoms.

16. The aqueous emulsion according to claim 1, wherein the ethylenically unsaturated monomer from (C) is (v) $CH_3CH=CHCOOR'_9$, and $R'_9$ is an alkyl group having from 8 to 12 carbon atoms.

17. The aqueous emulsion according to claim 1, wherein the ethylenically unsaturated monomer from (C) is (vi) $R'_{10}C_6H_4CR'_{11}=CHR'_{11}$, and $R'_{10}$ and $R'_{11}$, are independently an alkyl group having 1 carbon atom.

18. The aqueous emulsion according to claim 1, wherein the ethylenically unsaturated monomer from (C) is (vii) $R'_{12}CH=CHR'_{13}$, wherein $R'_{12}$ and $R'_{13}$ are independently selected from the group consisting of 2-pyrrolidinone, N-caprolactam, and an alkyl group having from 7 to 12 carbon atoms.

19. A method for preparing an aqueous emulsion comprising a water-dispersible copolymer characterized in that films formed from said water-dispersible copolymer are dispersible in water, yet non-dispersible in aqueous solutions containing 0.5% by weight or more of an inorganic salt, comprising the steps of:

(a) providing the following monomers in percentages by weight;
  (A) from about 40% 25% to about 80% of acidic ethylenically unsaturated monomers;
  (B) from about 10% to about 80% of ethylenically unsaturated monomer u selected from the group of monomer formulas consisting of:
    (i) $CH_2=C(R_1)COR_2$;
    (ii) $R_3OOC-CH=CH-COOR_4$,
    (iii) $CH_2=C(R_5)OCOR_6$;
    (iv) $CH_2=C(COOR_7)CH_2COOR_8$;
    (v) $CH_3CH=CHCOOR_9$;
    (vi) $R_{10}C_6H_4CR_{11}=CHR_{11}$; and
    (vii) $R_{12}CH=CHR_{13}$;
  wherein $R_1$ is hydrogen or methyl and $R_2$ is —OZ' or —N(Z'')(Z''), wherein Z' is an alkyl group from 1 to 7 carbon atoms, and Z'' is independently selected from the group consisting of hydrogen and alkyl groups having from 1 to 6 carbon atoms; $R_3$ and $R_4$ are independently hydrogen or an alkyl group having from 1 to 7 carbon atoms, with the proviso that $R_3$ and $R_4$ are not both hydrogen; $R_5$ is hydrogen or methyl and $R_6$ is an alkyl group having from 1 to 7 carbon atoms; $R_7$ and $R_8$ are independently hydrogen or an alkyl group having from 1 to 7 carbon atoms, with the proviso that $R_7$ and $R_8$ are not both hydrogen; $R_9$ is an alkyl group having from 1 to 7 carbon atoms; $R_{10}$ and $R_{11}$ are hydrogen; and $R_{12}$ and $R_{13}$ are independently selected from the group consisting of hydrogen, —CN, —NHCHO, and an alkyl group having from 1 to 7 carbon atoms; and (C) from about 10% to about 80% of ethylenically unsaturated monomer selected from the group of monomer formulas consisting of;
(i) $CH_2=C(R'_1)COR'_2$;
(ii) $R'_3OOC-CH=CH-COOR'_4$;
(iii) $CH_2=C(R'_5)OCOR'_6$;
(iv) $CH_2=C(COOR'_7)CH_2COOR'_8$;
(v) $CH_3CH=CHCOOR'_9$;
(vi) $R'_{10}C_6H_4CR'_{11}=CHR'_{11}$; and
(vii) $R'_{12}CH=CHR'_{13}$;
wherein $R'_1$ is hydrogen or methyl, and $R'_2$ is selected from the group consisting of —OZ', —N(Z")(Z"), and —OZ'"OH, wherein Z' is an alkyl group having from 8 to 18 carbon atoms; Z" is independently selected from the group consisting of alkyl groups having from 7 to 10 carbon atoms, dimethylamino alkyl groups having from 1 to 5 carbon atoms, and hydroxyalkyl groups having from 1 to 5 carbon atoms; and Z'" is an alkyl group having from 1 to 4 carbon atoms; $R'_3$ and $R'_4$ are independently an alkyl group having from 8 to 18 carbon atoms; $R'_5$ is hydrogen or methyl and $R'_6$ is an alkyl group having from a to 18 carbon atoms; $R'_7$ and $R'_8$ are independently an alkyl group having from 8 to 18 carbon atoms; $R'_9$ is an alkyl group having from 8 to 18 carbon atoms; $R'_{10}$ and $R'_{11}$ are independently an alkyl group having from 1 to 2 carbon atoms; $R'_{12}$ and $R'_{13}$ are independently selected from the group consisting of 2-pyrrolidinone, N-caprolactam, and an alkyl group having from 7 to 18 carbon atoms, with the proviso that $R_{12}$ and $R_{13}$ are not both 2-pyrrolidinone, are not both N-caprolactam, or are not a mixture thereof, and (b) emulsion polymerizing the monomers from (A), (B), and (C) in water at a solids level from about 20% to about 70% by weight, based on the aqueous emulsion, in the presence of a surfactant to form a copolymer having a weight average molecular weight greater than about 25,000.

20. The method according to claim 19, wherein the acidic ethylenically unsaturated monomer from (A) is selected from the group consisting of acrylic acid, methacrylic acid, maleic acid, maleic acid half esters, maleic anhydride, itaconic acid, crotonic acid, styrene sulfonic acid, 2-acylamido-2-methylpropane sulfonic acid, styrene phosphoric acid, and $CH_2=C(CH_3)COO(CH_2)_nOPO_3H$, wherein n is from 2 to 4.

21. The method according to claim 19, wherein the ethylenically unsaturated monomer from (B) is selected from the group consisting of
(i) $CH_2=C(R_1)COR_2$, wherein $R_1$ is methyl and $R_2$ is —OZ'$_1$, wherein Z' is an alkyl group having from 1 to 4 carbon atoms;
(ii) $R_3OOC-CH=CH-COOR_4$, wherein $R_3$ and $R_4$ are independently an alkyl group having from 1 to 4 carbon atoms;
(iii) $CH_2=C(R_5)OCOR_6$, wherein $R_5$ is methyl and $R_6$ is an alkyl group having from 1 to 4 carbon atoms;
(iv) $CH_2=C(COOR_7)CH_2COOR_8$, wherein $R_7$ and $R_8$ are independently an alkyl group having from 1 to 4 carbon atoms;
(v) $CH_3CH=CHCOOR_9$, wherein $R_9$ is an alkyl group having from 1 to 4 carbon atoms;
(vi) styrene; and
(vii) $R_{12}CH=CHR_{13}$, wherein $R_{12}$ and $R_{13}$ are independently hydrogen or methyl.

22. The method according to claim 19, wherein the ethylenically unsaturated monomer from (C) is selected from the group consisting of
(i) $CH_2=C(R'_1)COR'_2$, wherein $R'_1$ is methyl, $R'_2$ is selected from the group consisting of —OZ', —N(Z")(Z"), and —OZ'"OH, wherein Z' is an alkyl group having from 8 to 12 carbon atoms; Z" is independently selected from the group consisting of alkyl groups having from 8 to 10 carbon atoms, dimethylamino alkyl groups having from 1 to 3 carbon atoms, and hydroxyalkyl groups having from 1 to 3 carbon atoms; and Z'" is an alkyl group having from 1 to 2 carbon atoms;
(ii) $R'_3OOC-CH=CH-COOR'_4$, wherein $R'_3$ and $R_4$ are independently an alkyl group having from 8 to 12 carbon atoms;
(iii) $CH_2=C(R'_5)OCOR'_6$, wherein $R'_5$ is methyl, and $R'_6$ is an alkyl group having from 8 to 12 carbon atoms;
(iv) $CH_2=C(COOR'_7)CH_2COOR'_8$, wherein $R'_7$ and $R'_8$ are independently an alkyl group having from 8 to 12 carbon atoms;
(v) $CH_3CH=CHCOOR'_9$, and $R'_9$ is an alkyl group having from 8 to 12 carbon atoms;
(vi) $R'_{10}C_8H_4CR'_{11}=CHR'_{11}$, and $R'_{10}$ and $R'_{11}$ are independently methyl; and
(vii) $R'_{12}CH=CHR'_{13}$, wherein $R'_{12}$ and $R'_{13}$ are independently selected from the group consisting of 2-pyrrolidinone, N-caprolactam, and an alkyl group having from 7 to 12 carbon atoms.

23. A method for preparing an aqueous emulsion comprising a water-dispersible copolymer characterized in that films formed from said water-dispersible copolymer are dispersible in water, yet non-dispersible in aqueous solutions containing 0.5% or more of an inorganic salt, comprising the steps of:

(a) providing the following monomers in percentages by weight;
(A) from about 40% 25% to about 60% of acidic ethylenically unsaturated monomer;
(B) from about 10% to about 80% of ethylenically unsaturated monomer selected from the group of monomer formulas consisting of:
(i) $CH_2=C(R_1)COR_2$;
(ii) $R_3OOC-CH=CH-COOR_4$;
(iii) $CH_2=C(R_5)OCOR_8$;
(iv) $CH_2=C(COOR_7)CH_2COOR_8$;
(v) $CH_3CH=CHCOOR_9$;
(vi) $R_{10}C_6H_4CR_{11}=CHR_{11}$; and
(vii) $R_{12}CH=CHR_{13}$;
wherein $R_1$ is hydrogen or methyl and $R_2$ is —OZ' or —N(Z")(Z"), wherein Z' is an alkyl group having from 1 to 7 carbon atoms, and Z' is independently selected from the group consisting of hydrogen and alkyl groups having from 1 to 6 carbon atoms; $R_3$ and $R_4$ are independently hydrogen or an alkyl group having from 1 to 7 carbon atoms, with the proviso that $R_3$ and $R_4$ are not both hydrogen; $R_5$ is hydrogen or methyl and $R_6$ is an alkyl group having from 1 to 7 carbon atoms; $R_7$ and $R_8$ are independently hydrogen or an alkyl group having from 1 to 7 carbon atoms, with the proviso that $R_7$ and $R_8$ are not both hydrogen; $R_9$ is an alkyl group having from 1 to 7 carbon atoms; $R_{10}$ and $R_{11}$ are hydrogen; and $R_{12}$ and $R_{13}$ are independently selected from the group consisting of hydrogen, —CN, —NHCHO, and an alkyl group having from 1 to 7 carbon atoms; and (C) from about 10% to about 80% of ethylenically unsaturated monomer 4 selected from the group of monomer formulas consisting of:

(i) $CH_2=C(R'_1)COR'_2$;
(ii) $R'_3OOC—CH=CH—COOR'_4$;
(iii) $CH_2=C(R'_5)OCOR'_6$;
(iv) $CH_2=C(COOR'_7)CH_2COOR'_8$;
(v) $CH_3CH=CHCOOR'_9$;
(vi) $R'_{10}C_6H_4CR'_{11}=CHR'_{11}$; and
(vii) $R'_{12}CH=CHR'_{13}$;

wherein $R'_1$ is hydrogen or methyl, and $R'_2$ is select from the group consisting of —OZ', —N(Z")(Z'), and —OZ'"OH, wherein Z' is an alkyl group having from 8 to 18 carbon atoms; Z" is independently selected from the group consisting of alkyl groups having from 7 to 10 carbon atoms, dimethylamino alkyl groups having from 1 to 5 carbon atoms, and hydroxyalkyl groups having from 1 to 5 carbon atoms; and Z'" is an alkyl group having from 1 to 4 carbon atoms; $R'_3$ and $R'_4$ are independently an alkyl group having from 8 to 18 carbon atoms; $R'_5$ is hydrogen or methyl and $R'_6$ is an alkyl group having from 8 to 18 carbon atoms; $R'_7$ and $R'_8$ are independently an alkyl group having from 8 to 18 carbon atoms; $R'_9$ is an alkyl group having from 8 to 18 carbon atoms; $R'_{10}$ and $R'_{11}$ are independently an alkyl group having from 1 to 2 carbon atoms; $R'_{12}$ and $R'_{13}$ are independently selected from the group consisting of 2-pyrrolidinone, N-caprolactam, and an alkyl group having from 7 to 18 carbon atoms with the proviso that $R_{12}$ and $R_{13}$ are not both 2-pyrrolidinone, are not both N-caprolactam, or are not a mixture thereof; and (b) neutralizing the monomers from (A), (B), and (C) in water to a level from about 2% to about 15% molar of the acidic ethylenically unsaturated monomer from (A); and (c) emulsion polymerizing the monomers from (A), (B), and (C) at a solids level from about 20% to about 70% by weight, based on the aqueous emulsion, without a surfactant, to form a copolymer having a weight average molecular weight greater than about 25,000.

24. The method according to claim 23, wherein the acidic ethylenically unsaturated monomer from (A) is selected from the group consisting of acrylic acid, methacrylic acid, maleic acid, maleic acid half esters, maleic anhydride, itaconic acid, crotonic acid, styrene sulfonic acid, 2-acrylamido-2-methylpropane sulfonic acid, styrene phosphoric acid, and $CH_2=C(CH_3)COO(CH_2)_nOPO_3H$, wherein n is from 2 to 4.

25. The method according to claim 23, wherein the ethylenically unsaturated monomer from (B) is selected from the group consisting of:

(i) $CH_2=C(R_1)COR_2$, wherein $R_1$ is methyl and $R_2$ is —OZ', wherein Z' is an alkyl group having from 1 to 4 carbon atoms;

(ii) $R_3OOC—CH=CH—COOR_4$, wherein $R_3$ and $R_4$ are independently an alkyl group having from 1 to 4 carbon atoms;

(iii) $CH_2=C(R_5)OCOR_6$, wherein $R_5$ is methyl and $R_6$ is an alkyl group having from 1 to 4 carbon atoms;

(iv) $CH_2=C(COOR_7)CH_2COOR_8$, wherein $R_7$ and $R_8$ are independently an alkyl group having from 1 to 4 carbon atoms;

(v) $CH_3CH=CHCOOR_8$, wherein $R_9$ is an alkyl group having from 1 to 4 carbon atoms;

(vi) styrene; and (vii) $R_{12}CH=CHR_{13}$, wherein $R_{12}$ and $R_{13}$ are independently hydrogen or methyl.

26. The method according to claim 23, wherein the ethylenically unsaturated monomer from (C) is selected from the group consisting of:

(i) $CH_2=C(R'_1)COR'_2$, wherein $R'_1$ is methyl, $R'_2$ is selected from the group consisting of —OZ', N(Z") (Z"), and OZ'"OH, wherein Z' is an alkyl group having from 8 to 12 carbon atoms; Z" is independently. selected from the group consisting of alkyl groups having from 8 to 10 carbon atoms, dimethylamino alkyl groups having from 1 to 3 carbon atoms, and hydroxyalkyl groups having from 1 to 3 carbon atoms; and Z'" is an alkyl group having from 1 to 2 carbon atoms;

(ii) $R'_3OOC—CH=CH—COOR'_4$, wherein $R'_3$ and $R'_4$ are independently an alkyl group having from 8 to 12 carbon atoms;

(iii) $CH_2=C(R'_5)OCOR'_6$, wherein $R'_5$ is methyl, and $R'_6$ is an alkyl group having from 8 to 12 carbon atoms;

(iv) $CH_2=C(COOR'_7)CH_2COOR'_8$, wherein $R'_7$ and $R'_8$ are independently an alkyl group having from 8 to 12 carbon atoms;

(v) $CH_3CH=CHCOOR'_9$, and $R'_9$ is an alkyl group having from 8 to 12 carbon atoms;

(vi) $R'_{10}C_6H_4CR'_{11}=CHR'_{11}$, and $R'_{10}$ and $R'_{11}$ are independently methyl; and (vii) $R'_{12}CH=CHR'_{13}$, wherein $R'_{12}$ and $R'_{13}$ are independently selected from the group consisting of 2-pyrrolidinone, N-caprolactam, and an alkyl group having from 7 to 12 carbon atoms.

* * * * *